US00RE43825E

(19) United States
(12) Reissued Patent
Apisdorf et al.

(10) Patent Number: US RE43,825 E
(45) Date of Reissued Patent: Nov. 20, 2012

(54) SYSTEM AND METHOD FOR DATA FORWARDING IN A PROGRAMMABLE MULTIPLE NETWORK PROCESSOR ENVIRONMENT

(75) Inventors: Joel Zvi Apisdorf, Reston, VA (US); Sam Brandon Sandbote, Dallas, TX (US); Michael Daniel Poole, Herndon, VA (US)

(73) Assignee: The United States of America as Represented by the Secretary of the Navy, Washington, DC (US)

(21) Appl. No.: 11/942,275

(22) Filed: Nov. 19, 2007

Related U.S. Patent Documents

Reissue of:
(64) Patent No.: 6,968,447
Issued: Nov. 22, 2005
Appl. No.: 09/833,578
Filed: Apr. 13, 2001

(51) Int. Cl.
*G06F 9/00* (2006.01)

(52) U.S. Cl. ..... 712/225; 712/28; 712/216; 712/217; 712/235; 712/22

(58) Field of Classification Search ..... 712/225, 712/235, 17, 28, 216, 217
See application file for complete search history.

(56) References Cited

U.S. PATENT DOCUMENTS 4,897,814 A * 1/1990 Clark ..... 365/49.17
4,937,774 A * 6/1990 Malinowski ..... 708/315
4,941,143 A 7/1990 Twitty et al.
5,029,169 A 7/1991 Smyk
5,161,230 A * 11/1992 Carter et al. ..... 707/700
5,197,130 A 3/1993 Chen et al.
5,274,809 A 12/1993 Iwasaki et al.
5,374,916 A * 12/1994 Chu ..... 340/146.2
5,379,036 A * 1/1995 Storer ..... 341/51
5,450,563 A * 9/1995 Gregor ..... 711/3
5,487,024 A * 1/1996 Girardeau, Jr. ..... 708/606
5,493,669 A * 2/1996 Denman, Jr. ..... 711/133
5,522,083 A 5/1996 Grove et al.
5,524,212 A 6/1996 Somani et al.
5,592,628 A * 1/1997 Ueno et al. ..... 709/200
5,623,670 A 4/1997 Bohannon et al.
5,640,524 A 6/1997 Beard et al.
5,787,484 A * 7/1998 Norman ..... 711/159
5,805,915 A 9/1998 Wilkinson et al.
5,881,262 A * 3/1999 Abramson et al. ..... 712/216
5,905,712 A * 5/1999 Cresswell et al. ..... 370/238
5,964,841 A 10/1999 Rekhter
5,978,855 A 11/1999 Metz et al.
5,987,622 A * 11/1999 Lo Verso et al. ..... 714/6
6,000,024 A * 12/1999 Maddox ..... 712/11
6,044,438 A 3/2000 Olnowich
6,065,112 A 5/2000 Kishida et al.
6,151,644 A * 11/2000 Wu ..... 710/52
6,182,210 B1 1/2001 Akkary et al.

(Continued)

*Primary Examiner* — Idriss N Alrobaye
(74) *Attorney, Agent, or Firm* — Sterne, Kessler, Goldstein & Fox PLLC

(57) ABSTRACT

A system and method forward data between processing elements. A first processing element includes an address register that stores a first memory address. A forwarding storage element is coupled to the first processing element. A second processing element, coupled to the forwarding storage element, transmits a second memory address to the forwarding storage element. The forwarding storage transmits the second memory address to the first processing element, and the first processing element compares the second memory address with the first memory address.

13 Claims, 12 Drawing Sheets

U.S. PATENT DOCUMENTS 6,493,804 B1 12/2002 Soltis et al.
6,496,871 B1 12/2002 Jagannathan et al.
6,567,840 B1 5/2003 Binns et al.
6,629,233 B1 9/2003 Kahle
6,633,865 B1 * 10/2003 Liao ..... 1/1
6,763,519 B1 7/2004 McColl et al.
6,950,927 B1 9/2005 Apisdorf et al.
6,968,447 B1 * 11/2005 Apisdorf et al. ..... 712/235
6,978,459 B1 12/2005 Apisdorf et al.
2001/0023479 A1 9/2001 Kimura et al.
2003/0016686 A1 * 1/2003 Wynne et al. ..... 370/412

* cited by examiner

1200

1212

| 1202 DATA | 1204 ADDRESS | 1206 REGISTER # | 1208 TTL | 1210 LAST UPDATE |
|---|---|---|---|---|
| D1 | A1 | R1 | 3 | F |
| D2 | A2 | R2 | 2 | F |
| D3 | A3 | R3 | 4 | F |
| D4 | A4 | R4 | 1 | T |

.
.

FIG. 12

1300

| 1302 | 1304 | 1306 | 1308 | 1310 | 1312 | 1314 | 1316 |
|---|---|---|---|---|---|---|---|
| opcode | source 0 | source 1 | destination | update | sync | endstores | beginloads |

FIG. 13

SYSTEM AND METHOD FOR DATA FORWARDING IN A PROGRAMMABLE MULTIPLE NETWORK PROCESSOR ENVIRONMENT

Matter enclosed in heavy brackets [ ] appears in the original patent but forms no part of this reissue specification; matter printed in italics indicates the additions made by reissue.

CROSS-REFERENCE TO RELATED APPLICATIONS

The present invention is related to patent applications "System and Method for Processing Overlapping Tasks in a Programmable Network Processor Environment" (Ser. No. 09/833,581) and "System and Method for Instruction-Level Parallelism in a Programmable Network Processor Environment" (Ser. No. 09/833,580), both of which are incorporated herein by reference.

BACKGROUND OF THE INVENTION

1. Field of the Invention

The present invention relates generally to digital computing apparatus. More specifically, the present invention relates to network processors for processing network data elements.

2. Discussion of the Related Art

Network switches and routers, or network switch elements, form the backbone of digital networks, such as the Internet. Network switch elements connect network segments by receiving network data from ingress network segments and transferring the network data to egress network segments. Because large telecommunications switching facilities and central offices aggregate network traffic from extensive networks and many network segments, they require high-speed and high-availability switches and routers.

Network switch elements select the egress network segment by processing the address or destination included in the network data according to network data processing program logic. Traditionally, network switch elements included Application Specific Integrated Circuits (ASICs) that provided the program logic. Because ASICs are "hard-coded" with program logic for handling network traffic, they provide the high speed necessary to process a large volume of network data. ASICs, however, make it difficult to upgrade or reconfigure a network switch element, and it is expensive to design and fabricate a new ASIC for each new type of network switch element.

In response to these drawbacks, manufacturers of network switch elements are turning to programmable network processors to enable network switch elements to process network data. Programmable network processors process network data according to program instructions, or software, stored in a memory. The software allows manufacturers and users to define the functionality of the network switch elements—functionality that can be altered and changed as needed. With programmable network processors, manufacturers and users can change the software to respond to new services quickly, without costly system upgrades, as well as implement new designs quickly.

To the extent that there is a drawback to the use of programmable network processors in network switch elements, that drawback relates to speed. Because programmable network processors process network data using software, they are usually slower than a comparable hard-coded ASIC. One of the major design challenges, therefore, is developing programmable network processors fast enough to process the large volume of network data at large telecommunications switching facilities.

One technique used to increase speed in traditional processor design is "parallel processing," or processing multiple instructions in parallel. Parallel processing requires that instructions processed in parallel share access to devices, such as memory or peripherals. Known systems and methods for sharing access to devices, however, are not suitable for use in programmable network processors because network data is received at very high speeds, and must be processed on a time critical basis. Traditional device access techniques introduce unacceptable delays and timing problems into the network data processing.

SUMMARY OF THE INVENTION

The present invention provides a system and method for forwarding data between processing elements. In the system, a first processing element includes an address register that stores a first memory address. A forwarding storage element is coupled to the first processing element. A second processing element, coupled to the forwarding storage element, transmits a second memory address to the forwarding storage element. The forwarding storage transmits the second memory address to the first processing element, and the first processing element compares the second memory address with the first memory address.

In the method, data is forwarded between processing elements. A first memory address is stored to an address register at a first processing element. A second memory address associated with a second processing element is retrieved from a forwarding storage element. The first memory address is compared with the second memory address. A data register at the first processing element is updated with a data value from the second processing element in response to the comparing.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 12 illustrates the contents of a forward queue.

FIG. 13 illustrates an exemplary instruction.

DETAILED DESCRIPTION

Figure 1:
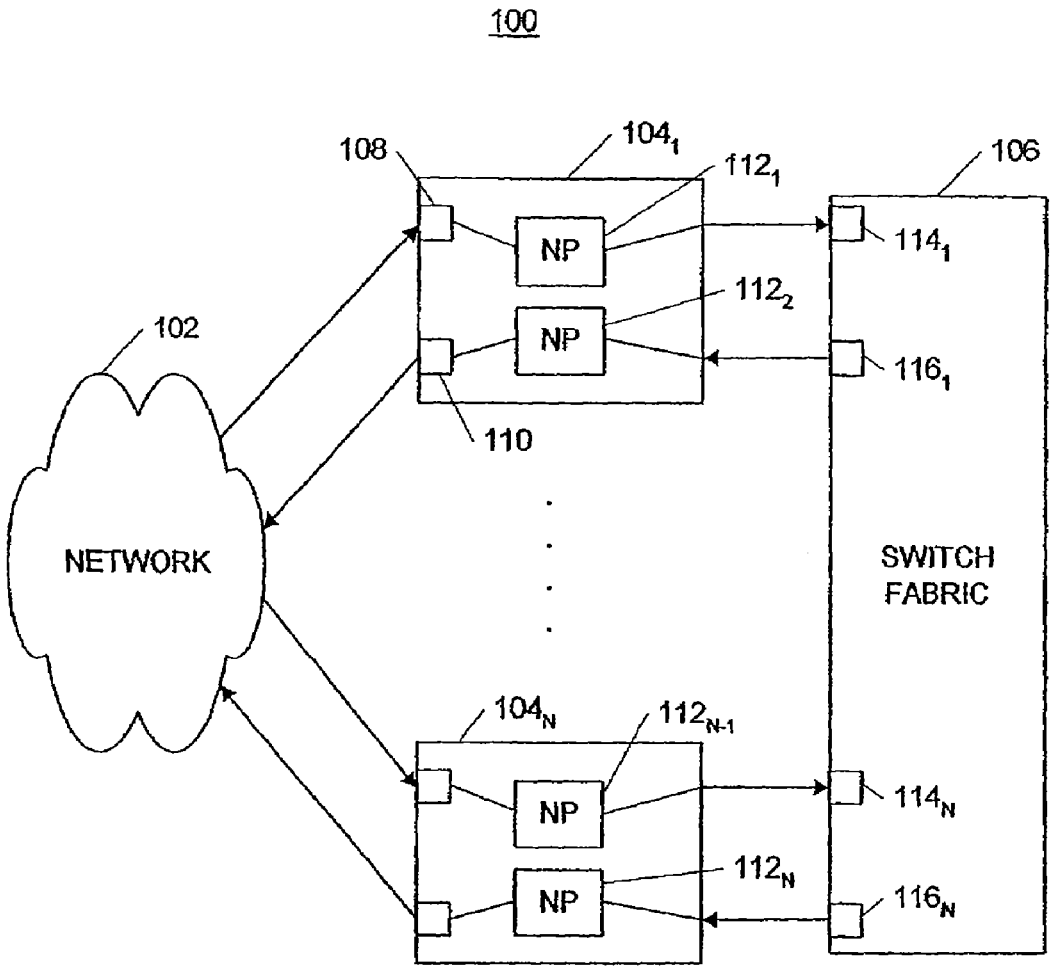
FIG. 1 illustrates a system block diagram of a data communications system.

Exemplary embodiments of the invention are discussed in detail below. While specific implementations are discussed, it should be understood that this is done for illustrative purposes only. A person skilled in the relevant art will recognize that other components and configurations may be used without parting from the spirit and scope of the invention.

Programmable network processors offer a number of advantages including flexibility, low cost, maintenance ease, decreased time to market, and increased service life. It is difficult, however, to develop a programmable network processor capable of meeting the demand for ever-increasing speed. One technique for increasing the speed of a programmable network processor is to employ a number of processing elements that can process network data elements in parallel. One example of processing network data elements in parallel is distributing individual network data elements from a stream of network data elements among a number of processing elements.

The nature of network data elements, however, poses problems to employing more than one processing element. First, due to the nature of network communications, network data elements are often order dependent and it is preferable that a programmable network processor send the network data elements in the same order that they are received. As such, it is also preferable that a programmable network processor maintain correct order in processing network data elements. Second, network management tasks, such as network traffic management, network policing, traffic shaping, etc., often depend on processing network data elements in order. This is because network data elements are often related (e.g., associated with the same network connection, ATM virtual circuit, or path), and the processing of successive network data elements is often dependent upon the processing of prior related network data elements. Although traditional techniques for employing multiple processing elements can be used to coordinate instruction sequencing to ensure correct order of actions, such traditional techniques would introduce unacceptable delays in high-performance network applications.

In addition to the "order" problem, other problems arise when multiple processors are intended to access shared resources. Examples of shared resources are shared memory, shared peripheral units, shared variables, etc. First, latency inherent in accessing shared resources results in lower processing speed. For example, when a processing element initiates a load operation to retrieve data from memory, it may take a significant amount of time before the data is received. This delay results in lower overall processing speed.

Second, because of the related nature of network data elements, conflict can occur between processing elements for access to shared resources. Consider, for example, a first processing element and a second processing element that are accessing the same shared variable. Suppose that the first processor accesses the shared variable, changes it, and initiates a storage operation to store the new value to memory. Because of latency and other timing issues, the second processing element may, while the first processing element is manipulating the shared variable, retrieve an invalid copy of the shared variable. Consequently, processing the invalid copy of the shared variable leads to corrupted data.

A first aspect of the present invention is primarily directed to a system and method for multiple processing elements arranged in a ring, or loop, to process network data elements cooperatively. One feature of the present invention is a system and method for providing communication between processing elements that enables a programmable network processor to ensure the correct order of processing of network data elements. In one embodiment, a first processing element suspends processing instructions until receiving a signal from a second processing element. The signal indicates that the first processing element may continue processing without risk of changing the order of network data elements or corrupting data values held by a shared resource.

A second aspect of the invention is primarily directed to a system and method for processing network data elements with yet greater efficiency than is possible just using the aspect of the invention summarized above. A feature of the present invention facilitates communicating data between processing elements. In one embodiment, a first processing element includes data to be written to a shared resource. In addition to writing the data to the shared resource, the data is forwarded to a second processing element. The second processing element is able to use the forwarded data immediately, rather than retrieving the data from the shared resource. Forwarding data between processing elements eliminates time delay due to latency. It should be recognized that the concepts described below are not restricted to processing network data elements but are extensible to a generic form of data processing. Prior to discussing the features of the present invention, a brief description of a data communications system is provided.

FIG. 1 illustrates a block diagram of a network data communications system, according to an embodiment of the present invention. Data communications system 100 can be, for example, of the type used by network service providers and telecommunication carriers to provide voice and data communications services to consumers. Data communications system 100 includes network 102, network line modules $\mathbf{104}_1$-$\mathbf{104}_N$, and switch fabric 106. Network 102 is connected to network line modules $\mathbf{104}_1$-$\mathbf{104}_N$ which, in turn, are connected to switch fabric 106. Although data communications system 100 is shown as including physical connections between the various components, other configurations are possible, such as wireless connections. Connections between network 102, network line modules $\mathbf{104}_1$-$\mathbf{104}_N$, and switch fabric 106 can be, for example, wireless data connections, electrical signals over wires, fiber optic connections (e.g., OC-48, OC-192, OC-768), or other data communications connections as would be apparent.

Network line modules $\mathbf{104}_1$-$\mathbf{104}_N$ send and receive network data elements to network 102. Network line modules $\mathbf{104}_1$-$\mathbf{104}_N$ process the network data elements and communicate the processed network data elements with switch fabric 106. Network data elements are signals carrying information including communications information. Examples of network data elements are asynchronous transfer mode ("ATM") cells, Frame Relay frames, Internet Protocol ("IP") packets, etc., including portions or segments of these. Processing includes performing a calculation or manipulation involving a network data element. Processing can include, for example, determining the next hop or egress port to which the network data element should be routed, network management, such as traffic shaping or policing, network monitoring, etc. Network 102 is a network for communicating network data elements. Network 102 can be, for example, the Internet, a telecommunications data network, an intranet, an extranet, a voice over data communications network, etc., and combinations thereof.

For explanatory purposes, operation of data communication system 100 is described in terms of network line module $\mathbf{104}_1$. Network line module $\mathbf{104}_1$ includes network line module ingress port 108, network line module egress port 110, and programmable network processors $\mathbf{112}_1$-$\mathbf{112}_2$. Note that the configuration of network line modules $\mathbf{104}_1$-$\mathbf{104}_N$ is shown for illustrative purposes only, and alternate configurations for network line modules $\mathbf{104}_1$-$\mathbf{104}_N$ are possible. Alternate configurations include, for example, single or additional programmable network processors per network line module, additional network line module ingress ports, multiple egress ports, additional connections to network 102, etc.

Network line module $\mathbf{104}_1$ receives network data elements from network 102 at network line module ingress port 108. Programmable network processor $\mathbf{112}_1$ receives network data elements from network line module ingress port 108. Programmable network processor $\mathbf{112}_1$ enables network line module $\mathbf{104}_1$ to process the received network data elements. Programmable network processor $\mathbf{112}_1$ provides the network data elements to switch fabric 106 after processing.

Switch fabric 106 includes switch fabric ingress ports $\mathbf{114}_1$-$\mathbf{114}_N$ and switch fabric egress ports $\mathbf{116}_1$-$\mathbf{116}_N$. Switch fabric ingress ports $\mathbf{114}_1$-$\mathbf{114}_N$ receive data from network line modules $\mathbf{104}_1$-$\mathbf{104}_N$ and switch fabric egress ports $\mathbf{161}_1$-$\mathbf{116}_N$ ports provide data to network line modules $\mathbf{104}_1$-$\mathbf{104}_N$. Switch fabric 106 outputs network data elements received from network processor $\mathbf{112}_1$ on the desired switch fabric egress port $\mathbf{116}_1$-$\mathbf{116}_N$. Network line module $\mathbf{104}_1$ receives processed network data elements from switch fabric egress port $\mathbf{116}_1$ and performs additional processing, as required, and transmits the network data element to network 102 via network line module egress port 110. Note that network line module ingress port 108, network element egress port 110, switch fabric ingress ports $\mathbf{114}_1$-$\mathbf{114}_N$, and switch fabric egress ports $\mathbf{116}_1$-$\mathbf{116}_N$ are logical representations of physical devices, and other combinations, such as single ports that transmit and receive network data elements are possible.

Figure 2:
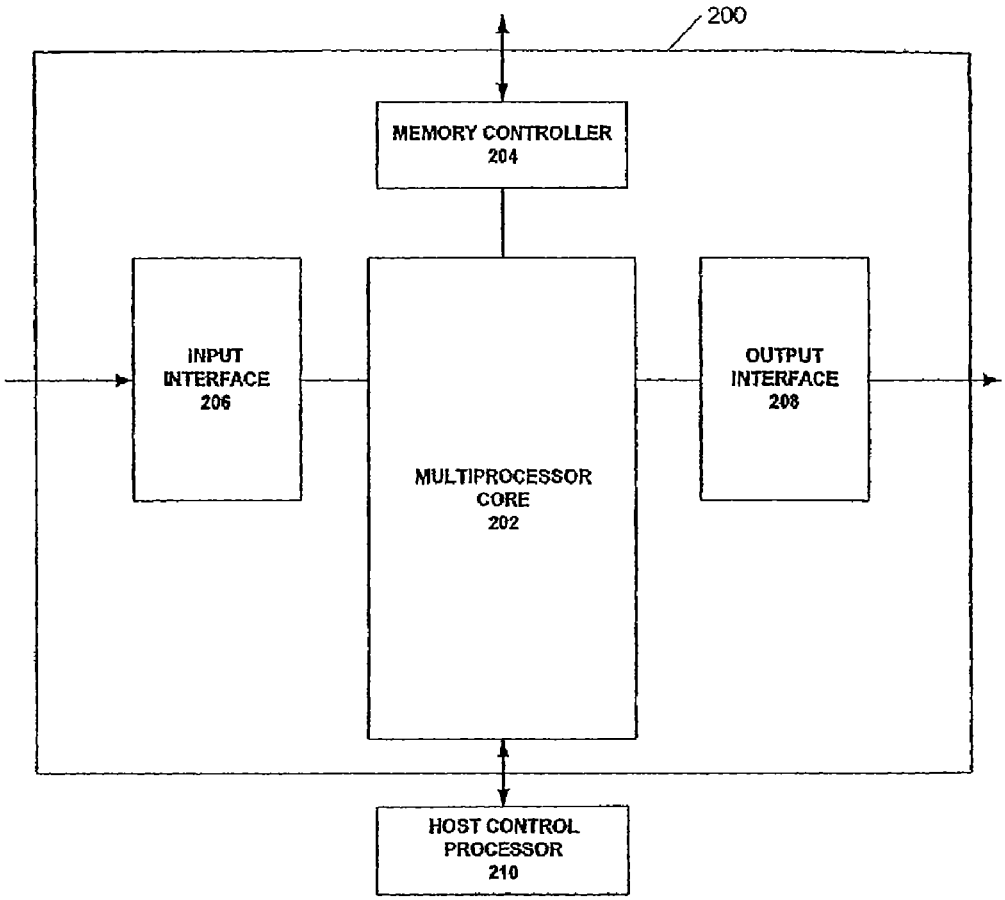
FIG. 2 illustrates a system block diagram of a programmable network processor.

FIG. 2 illustrates a system block diagram of a programmable network processor, according to an embodiment of the present invention. Programmable network processor 200 can be considered an exemplary embodiment of both ingress and egress programmable network processors $\mathbf{112}_1$-$\mathbf{112}_N$, as described above. Programmable network processor 200 includes memory controller 204, input interface 206, multiprocessor core 202, and output interface 208. Multiprocessor core 202 is connected to input interface 206, output interface 208, and memory controller 204. Note that the particular configuration, number, and type of elements of programmable processor 200 are shown for illustrative purposes only and other configurations of programmable network processor 200 are possible as would be apparent.

In operation, programmable network processor 200 receives network data elements from network line module ingress port 108 via input interface 206. Input interface 206 receives the network data elements and provides them to multiprocessor core 202 for processing as described above. Multiprocessor core 202 processes the network data elements and provides the result to output interface 208. Output interface 208 receives processed network data elements from multiprocessor core 202 and forwards them to switch fabric 106 for routing. Multiprocessor core 202 accesses storage located off programmable network processor 200 via memory controller 204.

Multiprocessor core 202 is connected to host control processor 210. Host control processor 210 provides host functionality for programmable network processor 200. Such host functionality includes, for example, generating and receiving network data elements for controlling switch fabric 106, network line modules $\mathbf{104}_1$-$\mathbf{104}_N$, and other network components. Host control processor 210 performs other functions, such as generating network data elements for switch fabric control, setting up network connections, and loading programs into multiprocessor core 202 for operation.

Figure 3:
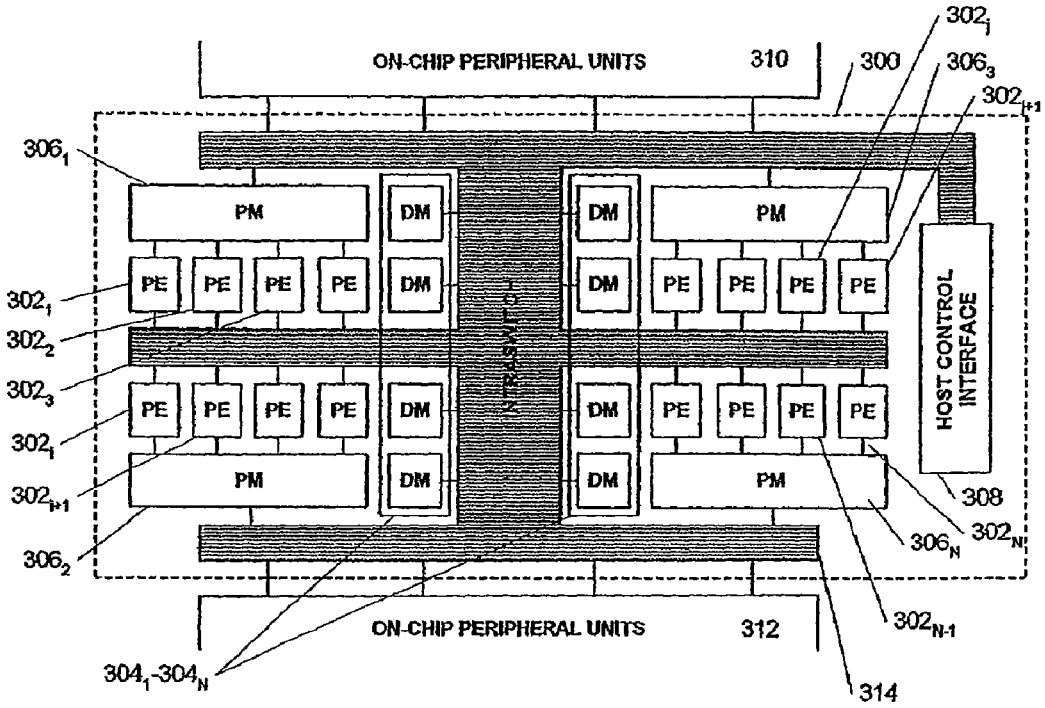
FIG. 3 illustrates a system block diagram of a multiprocessor core.

FIG. 3 illustrates a system block diagram of a multiprocessor core, according to an embodiment of the present invention. Multiprocessor core 300 is an exemplary embodiment of multiprocessor core 202, as described above, and is of the type that can be employed in data communications system 100. Multiprocessor core 300 includes processing elements (PE) $\mathbf{302}_1$-$\mathbf{302}_N$, data memories (DM) $\mathbf{304}_1$-$\mathbf{304}_N$, program memories (PM) $\mathbf{306}_1$-$\mathbf{306}_N$, intraswitch 314, and host controller interface 308. Processing elements $\mathbf{302}_1$-$\mathbf{302}_N$ are connected to program memories $\mathbf{306}_1$-$\mathbf{306}_N$, and intraswitch 314. Data memories $\mathbf{304}_1$-$\mathbf{304}_N$ are connected to intraswitch 314. Program memories $\mathbf{306}_1$-$\mathbf{306}_N$ are connected to processing elements $\mathbf{302}_1$-$\mathbf{302}_N$ and intraswitch 314. Host controller interface 308 is connected to intraswitch 314. Intraswitch 314 is connected to on-chip peripheral units 310 and 312. Examples of on-chip peripheral units 310 and 312 are input interface 206, output interface 208, and memory controller 204 of FIG. 2.

While not shown in FIG. 3 for purposes of diagrammatic clarity, a number of direct connections exist between processing elements $\mathbf{302}_1$-$\mathbf{302}_N$. Similarly, host controller interface 308 is connected to each of processing elements $\mathbf{302}_1$-$\mathbf{302}_N$. Examples of the connections between processing elements $\mathbf{302}_1$-$\mathbf{302}_N$ are described in further detail with reference to FIGS. 4A-4B below.

Processing elements $\mathbf{302}_1$-$\mathbf{302}_N$ process network data elements, thereby providing the processing functionality for multiprocessor core 300. Processing elements $\mathbf{302}_1$-$\mathbf{302}_N$ execute program instructions from program memories $\mathbf{306}_1$-$\mathbf{306}_N$, and load and store data in data memories $\mathbf{304}_1$-$\mathbf{304}_N$. Note that processing elements $\mathbf{302}_1$-$\mathbf{302}_N$ can be anything that processes program instructions including, for example, microprocessors, configurable processors, etc.

Program memories $\mathbf{306}_1$-$\mathbf{306}_N$ and data memories $\mathbf{304}_1$-$\mathbf{304}_N$ provide data storage functionality for the various elements of multiprocessor core 300. Program memories $\mathbf{306}_1$-$\mathbf{306}_N$ store program instructions for the processing of network data elements by processing elements $\mathbf{302}_1$-$\mathbf{302}_N$. Although FIG. 3 depicts groups of four processing elements directly connected to one of program memories $\mathbf{306}_1$-$\mathbf{306}_N$, other configurations connecting program memory to processing elements are possible including, for example, the use of a separate program memory with each processing element, as would be apparent. Data memories $\mathbf{304}_1$-$\mathbf{304}_N$ provide on-chip storage for data, such as intermediate-results data from processing network data elements, for the operation of processing elements $\mathbf{302}_1$-$\mathbf{302}_N$.

Intraswitch 314 enables communication between the various components of multiprocessor core 300. For example, processing elements $\mathbf{302}_1$-$\mathbf{302}_N$ access data memories $\mathbf{304}_1$-$\mathbf{304}_N$ through intraswitch 314. Intraswitch 314 can be, for example, a switching fabric in multiprocessor core 300, or individual trace connections in multiprocessor core 300. Host controller interface 308 connects multiprocessor core 300 to host control processor 210. Multiprocessor core 300 is connected to on-chip peripheral units 310 and 312 via intraswitch 314.

In operation, multiprocessor core 300 receives network data elements from on-chip peripheral units 310 and 312. Processing elements $\mathbf{302}_1$-$\mathbf{302}_N$ receive the network data elements and process them according to the programs stored as instructions in program memories $\mathbf{306}_1$-$\mathbf{306}_N$. The intermediate results and final results of the processing operations are stored in data memories $\mathbf{304}_1$-$\mathbf{304}_N$. After a network data element has been processed, it is sent to on-chip peripheral units 310 and 312.

Figure 4A:
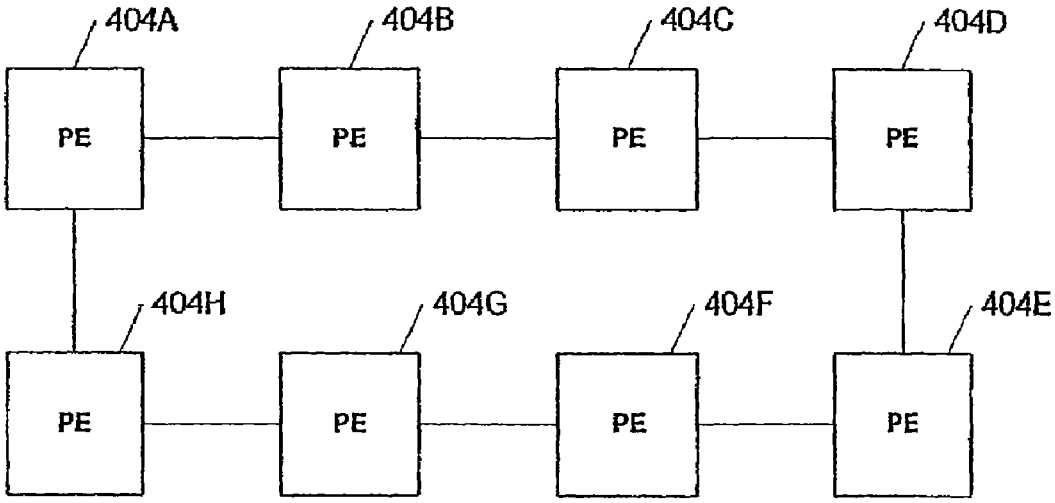
FIGS. 4A-4B illustrate connections between processing elements.
Figure 4B:
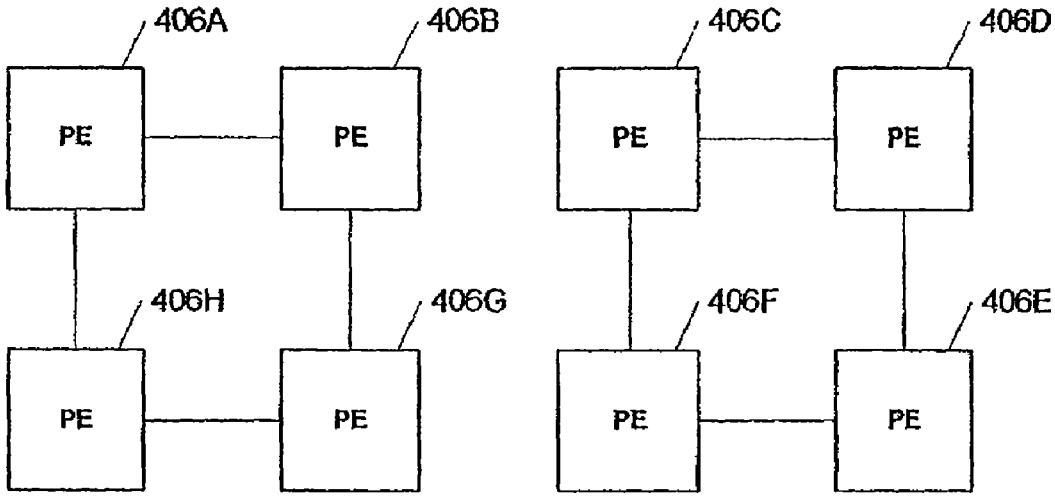

FIGS. 4A-4B are block diagrams illustrating exemplary configurations of connections between processing elements, according to an embodiment of the present invention. Each of processing elements 404A-404H and processing elements 406A-406H are exemplary embodiments of one of processing elements $302_1$-$302_N$ in FIG. 3, and of the type that can be employed in data communications system 100. The processing elements of FIGS. 4A-4B can be chosen as a combination of processing elements $302_1$-$302_N$ of multiprocessor core 300.

The connections between processing elements processing elements 404A-404H and processing elements 406A-406H enable communication of data and signals between the connected processing elements. More specifically, the connections between processing elements 404A-404H and processing elements 406A-406H enable the communication of end critical section signals, data forwarding signals, and end stores signals described in further detail below. Examples of connections are metal or doped silicon traces included in multiprocessor core 300, optical connections, etc.

FIG. 4A illustrates one exemplary embodiment for a processing team. The team defined by processing elements 404A-404H is in a ring, or loop, configuration. Each of processing elements 404A-404H can communicate via the connections. In one possible embodiment, the communication occurs in one direction (i.e., clockwise or counterclockwise) around the ring. Each processor is connected to an "upstream" processor and a "downstream" processor. For example, assuming that processing elements 404A-404H communicate in a clockwise direction, processing element 404H is upstream from processing element 404A, and processing element 404B is downstream from processing element 404A. Likewise, from the perspective of 404H, processing element 404A is downstream, while 404G is upstream.

Note that new teams can be formed by making and breaking connections between processing elements. The connections between the processing elements can be made and broken, for example, in the manufacturing process, electrically through the configuration of multiprocessor core 300, in software by enabling or disabling the connections between processing elements, or through optical switching in the case of optical connections between the processing elements.

FIG. 4B illustrates an alternate configuration for two processing element teams. In comparison to FIG. 4A, there are no connections between processing elements 406B and 406C, nor between processing elements 406G and 406F. The arrangement forms two teams. Each of the teams ((406A, 406B, 406G, and 406H) and (406C, 406D, 406E, and 406F)) are in a ring configuration. Note that although FIGS. 4A-4B show teams of processors including eight and four processing elements, respectively, other configurations are possible. A team of processing elements may include as many processing elements as is practical.

Figure 5:
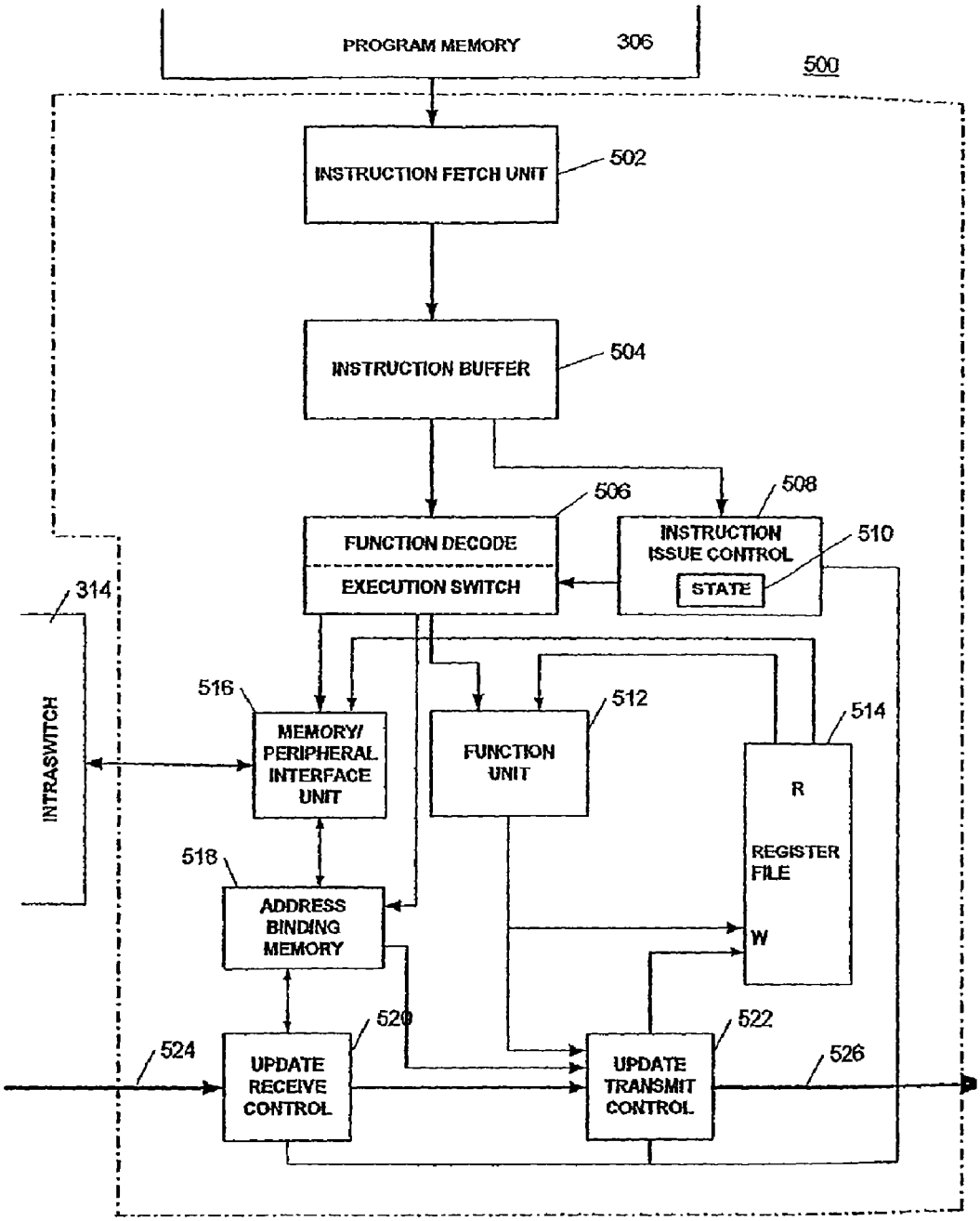
FIG. 5 illustrates a system block diagram of an exemplary processing element.

FIG. 5 illustrates a system block diagram of an exemplary processing element, according to an embodiment of the present invention. Processing element 500 is an example of one of the processing elements shown in FIGS. 3-4, and of the type that can be employed in data communications system 100. Note that processing element 500 is provided for illustrative purposes only and other processing element configurations are possible. Processing element 500 includes instruction fetch unit 502, instruction buffer 504, function decode and execution switch 506, instruction issue control 508, memory/peripheral interface unit 516, function unit 512, register file 514, update receive control 520, update transmit control 522, upstream connection 524, and downstream connection 526. Instruction issue control 508 further includes state element 510. Note, however, that although state element 510 is shown as part of instruction issue control 508, other configurations are possible where state element 510 is connected to, but not included in, instruction issue control 508.

Instruction fetch unit 502 retrieves program instructions from program memory 306 for execution within processing element 500 and is connected to instruction buffer 504. Instruction buffer 504, in turn, is connected to function decode and execution switch 506 and instruction issue control 508. Function decode and execution switch 506 is connected to instruction buffer 504, address binding memory 518, and instruction issue control 508. Function decode and execution switch 506 is connected to memory/peripheral interface unit 516 and function unit 512.

Memory/peripheral interface unit 516 and function unit 512 receive memory/peripheral access instructions and processing instructions, respectively, from function decode and execution switch 506. Memory/peripheral interface unit 516 is connected to intraswitch 314, over which memory/peripheral interface unit 516 accesses data memory $304_1$-$304_N$ and peripheral units (not shown in FIG. 5). Function unit 512 is connected to function decode and execution switch 506, register file 514, and update transmit control 522. Update transmit control provides end critical section signals to a downstream processing element via downstream connection 526, as described below in further detail in conjunction with FIG. 6.

Memory/peripheral interface unit 516 is connected to address binding memory 518. Address binding memory 518 is connected to update transmit control 522. Address binding memory 518 stores memory addresses received from memory/peripheral interface unit 516, as described in further detail below. Update receive control 520 is connected to update transmit control 522, instruction issue control 508, and an upstream processing element via upstream connection 524.

Figure 6:
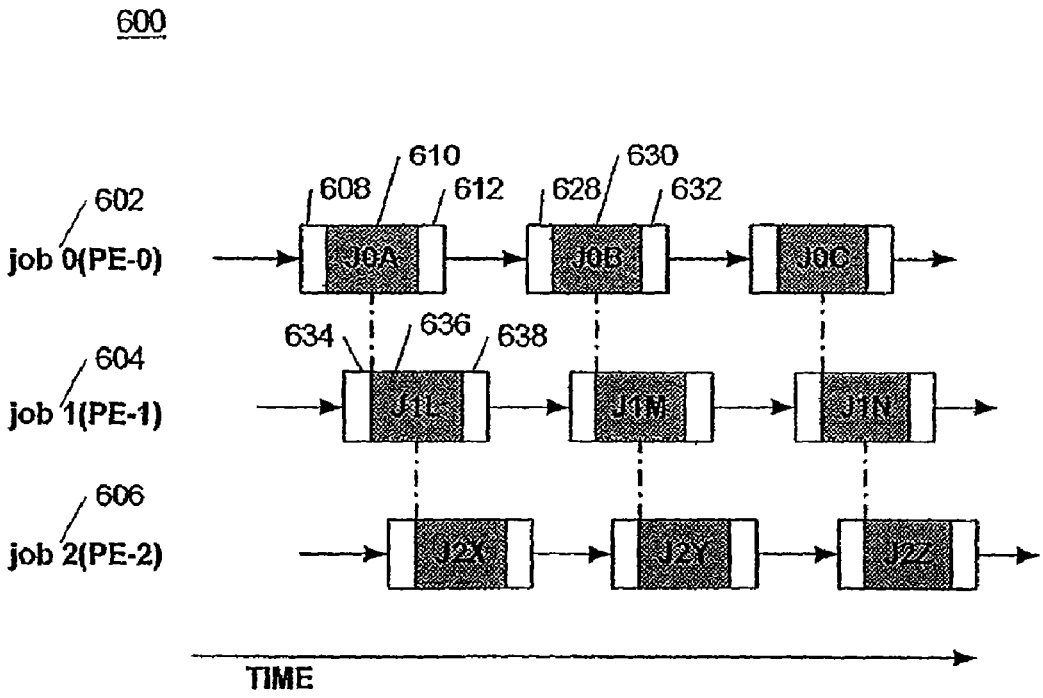
FIG. 6 illustrates concurrent processing of three jobs.

FIG. 6 is a diagram illustrating concurrent processing of three jobs by three processing elements in a processing element team, according to an embodiment of the present invention. A job is a series of program instructions that are executed on a processing element. A job can be, for example, the instructions associated with processing a single network data element.

Consider, for example, the situation in which each job is associated with a single ATM cell. A programmable network processor, such as programmable network processor 200, receives an ATM cell from network 102. A program of instructions running on a processing element, such as one of processing elements $302_1$-$302_N$, processes the ATM cell as a job. Each time another network data element is received, a new job is created for processing the cell. Although an ATM cell is provided as an example, other configurations are possible. A job can be associated with one or more of any type of network data element, or a portion thereof.

FIG. 6 includes three jobs, job 0 ("job 602"), job 1 ("job 604"), and job 2 ("job 606"). Each of job 602, job 604, and job 606, are shown as being processed by processing element 0 ("PE-0"), processing element 1 ("PE-1"), and processing element 2 ("PE-2"), respectively. PE-0, PE-1, and PE-2 can be, for example, processing element 500 shown in FIG. 5.

In the example of FIG. 6, each of PE-0, PE-1, and PE-2 are members of a single processing team in which PE-0 is upstream from PE-1, and PE-1 is upstream from PE-2. Consider, for example, the processor element team of FIG. 4B. Each of jobs 602-606 is associated with a single processing element in the team. In this example, processing element 404H executes job 602, processing element 404A executes job 604, and processing element 404B executes job 606. In this example, each of the succeeding jobs is associated with the processing element downstream from the previous job, so that processing element 404H is upstream from the processing element executing the instructions of job 604. Note, however, that this example is provided for illustrative purposes only, and other processor team configurations that process concurrent jobs are possible.

Additionally, each of jobs 602, 604, and 606 includes three (for illustration) sequential tasks shown as three boxes in a horizontal row. A task is a portion of a job that includes at least one instruction. The tasks of each job are processed chronologically from left to right, as indicated by the "TIME" legend at the bottom of FIG. 6. Job 602 includes tasks J0A, J0B, and J0C; job 604 includes tasks J1L, J1M, and J1N; job 606 includes tasks J2X, J2Y, and J2Z. Task J0A includes critical section 610; task J0B includes critical section 630; and task J1L includes critical section 636.

A critical section is an instruction or series of instructions that utilize a shared resource. A shared resource can be any resource that includes data or information that is capable of being referenced by more than one job. Examples of shared resources are shared memory, shared peripherals, shared variables, etc. Consider, for example, a variable stored in data memory and shared between two jobs (i.e., a "shared variable"). A first job reads the shared variable from memory with a load instruction, uses the variable to perform processing, changes the variable value, and stores the new value back to the shared variable in memory. Subsequent to the first job accessing the shared variable, for example, a second job accesses the shared variable from the memory location for processing.

A shared peripheral can be any resource that maintains state information between references by jobs. For example, a shared peripheral can be a device with more than one state. Examples of state sensitive resources include counters, flip-flops, latches, etc. Consider, for example, a hardware counter that is shared between two jobs. A first job reads the value of the hardware counter, and subsequently increments the hardware counter. A second job reads the value of the hardware counter, and increments the hardware counter. Counters, and other state sensitive hardware peripherals can be used to ensure the validity of received network data elements, track the number of network data elements received for a given network connection, etc.

Returning to the ATM cell example, consider a possible relationship between ATM cells. A relationship can exist, for example, if the cells are associated with the same network connection. Because the program processing the related cells is likely similar, if not identical, it is likely that the jobs processing the cells will access the same shared resources. Often, correct processing of related cells requires that the jobs access the shared resource in the same order that the cells are assigned to jobs.

The tasks of FIG. 6 include pre-critical sections and post-critical sections. Task J0A includes pre-critical section 608; task J0B includes pre-critical section 628; and task JIL includes pre-critical section 634. A pre-critical section is an instruction or series of instructions in a task that are processed before instructions of a critical section. Task J0A includes post-critical section 612; task J0B includes post-critical section 632; and task J1L includes post-critical section 638. A post-critical section is at least one instruction that is processed after the critical section instructions in a task. Note that although the tasks of FIG. 6 are shown as including pre-critical sections, critical sections and post-critical sections, other combinations are possible, for example, tasks that do not include critical sections, tasks that do not include pre-critical sections, and tasks that do not include post-critical sections.

FIG. 6 illustrates the problem of conflict between overlapping critical sections. FIG. 6 shows how critical sections can overlap, causing conflict, in the absence of the present invention. As shown, critical section 610 of task J0A overlaps with critical section 636 of task J1L. In this situation, conflict can occur between instructions in two jobs that access the same shared resource. Consider, for example, instructions in critical section 610 and critical section 636 accessing a shared variable. Instructions in critical section 610 may access the shared variable, and increment the variable. Meanwhile, instructions in critical section 636 have accessed the same shared variable. Because the two accesses are in conflict (i.e., attempting to access the shared variable at the same time), task J0A or task J1L may not operate on the correct value of the shared variable, resulting in program failure. Processing multiple network data elements concurrently on multiple processing elements, therefore, requires a mechanism to ensure preservation of order in processing network data elements.

Figure 7:
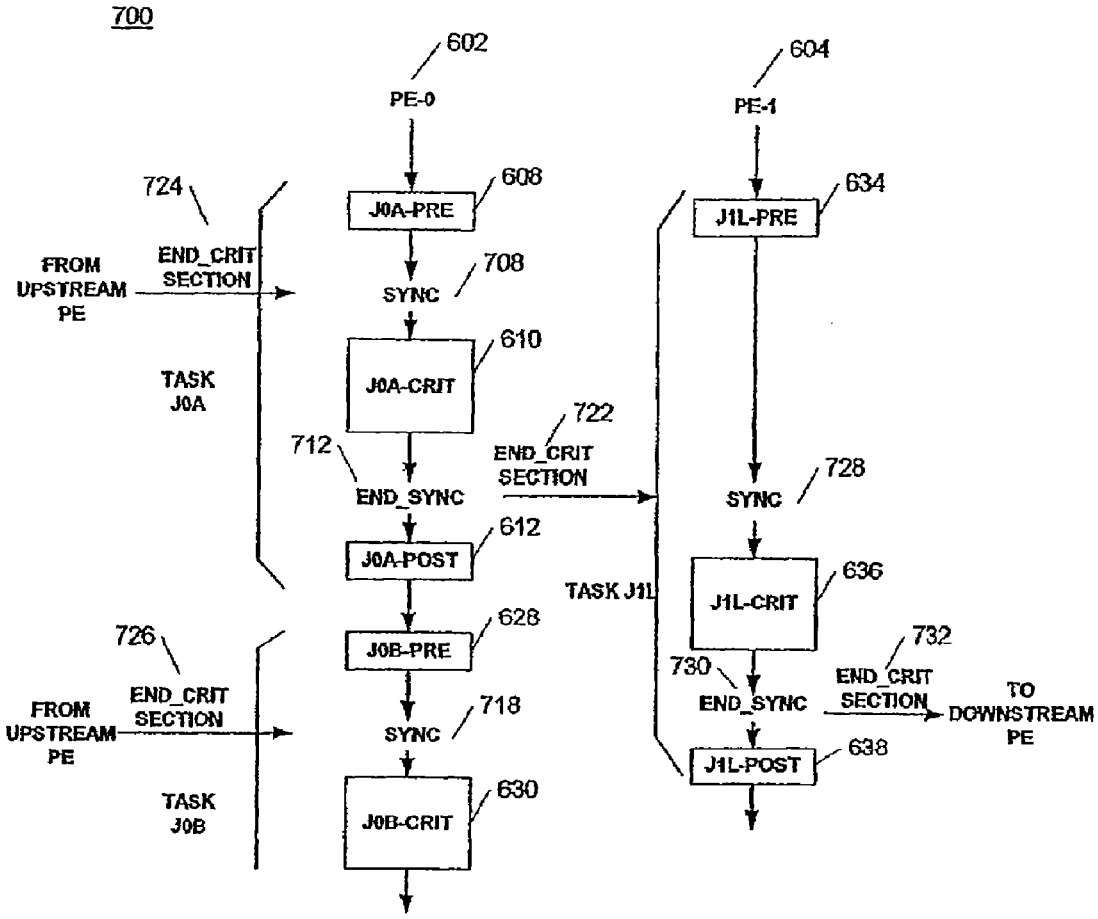
FIG. 7 illustrates a job processing diagram.

FIG. 7 illustrates a job processing diagram, according to an embodiment of the present invention. Job processing diagram 700 shows PE-0 and PE-1 processing job 602 and job 604 from top to bottom, respectively. Job processing diagram 700 flows from top to bottom, showing the processing steps for task J0A and J0B of job 602, and the processing steps for task J1L of job 604. PE-1 is a processing element downstream from PE-0.

Task J0A includes pre-critical section 608, sync indicator 708, critical section 610, end sync indicator 712 and post-critical section 612. Task J0B includes pre-critical section 628, sync indicator 718, and critical section 630. End critical section signals 724 and 726 are signals received from a processing element upstream from PE-0 (not shown in FIG. 7).

Task J1L of job 604 is shown as being processed by PE-1, and includes pre-critical section 634, sync indicator 728, critical section 636, end sync indicator 730, and post-critical section 638. End critical section signal 722 is a signal sent from upstream PE-0 to downstream PE-1, as described in further detail below.

Processing job 602 and job 604 according to job processing diagram 700 advantageously solves the overlapping critical section problem and maintains the processing order of network data elements. In general, a downstream processor does not process a critical section until an end critical section signal is received from an upstream processor. Consider, for example, PE-1 processing job 604. If PE-1 detects a critical section in a task, such as critical section 636, before end critical section is received, PE-1 suspends processing task J1L. If, on the other hand, PE-1 receives end critical section signal 722 before encountering critical section 636, PE-1 never suspends operation, and processes critical section 636 without interruption. End critical section signal 722 indicates that the upstream processor has finished processing a critical section, such as critical section 610, and ensures that PE-0 and PE-1 are not in conflict for shared or state sensitive resources.

It should be noted that although job 602 and job 604 are described as suspending processing of tasks until end critical section signals are received, this is for illustrative purposes only. In operation, if an end critical section is received before a critical section of a task is encountered, processing can continue without suspension.

Job processing diagram 700, and the operation of PE-0 and PE-1 are now described with reference to the elements of exemplary processing element 500, shown in FIG. 5. PE-0 begins processing task J0A at pre-critical section 608. Instruction fetch unit 502 fetches the instructions associated with pre-critical section 608 from program memory 306. After instruction buffer 504 loads the instruction from instruction fetch unit 502, instruction issue control 508 examines the instruction in instruction buffer 504.

Instruction issue control 508 determines if the instruction in instruction buffer 504 includes a sync indicator. A sync indicator identifies the beginning of a critical section. If the instruction does not include a sync indicator (as is the case with instructions in pre-critical section 608) instruction buffer 504 provides the instruction to function decode and execution switch 506. If the instruction is a load instruction (i.e., retrieves data from memory), or a store instruction (i.e., stores data to memory), function decode and execution switch 506 issues the instruction to memory/peripheral interface unit 516. Memory/peripheral interface unit 516 accesses the memory or peripheral, per the instruction. If the instruction is an arithmetic instruction, function decode and execution switch 506 provides the instruction to function unit 512 for execution. Other types of instruction execution units can be included, as would be apparent. After PE-0 has processed the instructions in pre-critical section 608, instruction fetch unit 502 fetches sync indicator 708 from program memory 306.

Sync indicator 708 identifies the beginning of critical section 610 in task J0A. In one embodiment, sync indicator 708 is the first instruction in critical section 610 that includes an additional bit, or "sync bit," identifying the instruction as included in a critical section. The sync bit can be included in a number of ways to indicate the beginning or end of a critical section. For example, setting the sync bit in every instruction in a critical section, setting the sync bit in the first and last instructions in a critical section, setting the sync bit in the first instruction of a critical section and the first instruction in a post-critical section, additional instruction bits indicating the end of a critical section, etc. Note also that a sync indicator can be associated with the first instruction of a critical section (in which case it takes effect before the instruction is executed) or can be associated with the preceding instruction (in which case it takes effect after the instruction is executed). Similarly, an end sync indicator can be associated with the last instruction in a critical section, or the instruction immediately following the last instruction in a critical section.

Although one embodiment is described in terms of sync bits, other types of sync indicators are possible. For example, sync indicator 708 can be a particular type of instruction, such as a shared memory instruction or shared peripheral instruction, that instruction issue control 508 identifies, sync indicator 708 can be a type of no-op instruction identifying the beginning of a critical section, etc. Note that although job processing diagram 700 shows sync indicator 708 separate from critical section 610, in one embodiment, sync indicator 708 is part of an instruction included in critical section 610.

Instruction fetch unit 502 loads the sync indicator 708 into instruction buffer 504. Instruction issue control 508 detects the presence of sync indicator 708 in instruction buffer 504, indicating that PE-0 is to change from a first operative state, or "normal mode" into a second operative state, or "critical section mode." Generally, in normal mode, PE-0 operates normally, processing non-critical section instructions. In critical section mode, processing element 500 processes critical-section instructions. In order for PE-0 to enter critical section mode, update receive control 520 must receive end critical section signal 724 from an upstream processing element. End critical section signal 724 indicates that the upstream processing element is not in critical section mode, and that PE-0 is free to enter critical section mode without risk of conflict.

State element 510 stores state information (e.g., a bit) identifying either normal mode or critical section mode for PE-0. To process sync indicator instruction 708, or instructions in critical section 610, PE-0 must have received end critical section signal 724 from the upstream processor. In example processing element unit 500, update receive control 520 receives critical section end signal 724 via upstream connection 524. If instruction issue control 508 receives a signal from update receive control 520 indicating the presence of end critical section signal 724, instruction issue control 508 is permitted to set state element 510 to critical section mode. PE-0 then processes instructions in critical section 610.

If, on the other hand, instruction issue control 508 has not received indication from update receive control 508 of arrival of end critical section signal 724, processing element 500 suspends processing instructions when it reaches sync indicator 708. When end critical section signal 724 is received from the upstream processing element, instruction issue control 508 resumes issuing instructions for execution.

PE-0 processes the instructions of critical section 610 similar to processing pre-critical section 608, once update receive control 520 receives critical section end signal 724. While processing critical section 610 in critical section mode, instruction issue control 508 detects end sync indicator 712, identifying the end of critical section 610. Instruction issue control signals update transmit control 522, causing end critical section signal 722 to be sent to downstream processing element PE-1. PE-0 then continues processing task J0A at post-critical section 612.

It should be noted that provisions should be made for the case in which a processing element sends multiple end critical section signals to a downstream processing element before the downstream processing element processes the corresponding critical sections. Consider, for example, the case in which a processing element, such as PE-0, processes two end sync indicators, causing PE-0 to generate two end critical section signals. If a downstream processing element, such as PE-1, has not yet processed a critical section associated with the first end critical section signal (e.g., it is suspended), PE-1 and PE-0 may gel out of sync and cause program errors. Some mechanism, such as an acknowledge signal from PE-1 to PE-0 can be provided that ensures that PE-0 suspends processing critical sections if PE-1 has yet to process a critical section. Alternately, a counter can record the number of end critical section signals that have been received, as described below.

In an alternate embodiment, each processing element can include an end critical section signal counter that records receipt of end critical section signals. Generally, the counter can be initialized to some value, and each time the processing element processes a critical section, the counter can be decremented. Eventually, the counter reaches zero, and the processing element suspends instruction execution before entering a new critical section. The processing element resumes processing when the counter is incremented upon receiving an end critical section signal from an adjacent, upstream, processing element. If, for example, the counter is initialized at zero, processing elements downstream from a particular processing element can not process critical sections before receiving an end critical section signal. In one possible embodiment, state element 510 provides the physical implementation for an end critical section signal counter.

Consider, for example, a team including three processing elements. Since none of the processing elements can process a critical section without receiving an end critical section signal, one of the processors is designated as the "start" processing element. The end critical section signal counter of the start processing element is incremented to at least one (e.g., by system software or a host controller), and the end critical section signal counters of the rest of the processing elements are zeroed. The team begins processing jobs in normal mode. Necessarily, the start processing element is the first processing element to encounter and process a critical section. The start processing element decrements its end critical section signal counter when it processes the critical section. After processing the critical section, the start processing element provides an end critical section signal to a second, downstream, processing element.

The second processing element increments its critical section end signal counter when the end critical section signal is received from the start processing element. The second processing element may now decrement the counter and process a critical section. Processing was suspended if the second processing element had encountered a critical section before receiving the end critical section signal. In the alternative, processing the next critical section will proceed uninterrupted if a critical section has not yet been encountered. As is apparent, the processing element downstream may not process a critical section until an end critical section signal is received from the second processing element. This advantageously ensures that no processing elements in the team process a critical section until an end critical section signal is received.

The size of the end critical section signal counter can be chosen to accommodate the number of critical sections a job can include. Jobs for processing network data elements often include a known or predictable number of critical sections. An end critical section signal counter that can be incremented a number of times equal to the maximum number of critical sections in a job ensures that a processing element will not overflow the counter of a downstream processing element. For example, given a sufficient number of end critical section signals (that increment the end critical section signal counter), a processing element can process all of the critical sections in a job. As a result, the processing element sends an end critical section signal to a downstream processing element each time a critical section is completed. If the downstream processing element is stalled, the end critical section signal counter should be of sufficient size to accommodate all of the end critical section signals. Once the downstream processing element resumes processing the job, it can process critical sections and decrement the end critical section signal counter. Note that to ensure that end critical section signal counters in a processing element team do not get out of sync, care should be taken to ensure that the jobs on different processing elements include same number of critical sections, or that some mechanism is provided that accounts for branching in the program flow of jobs.

Additionally, other incrementing and decrementing schemes can be used to maintain synchronization between processing elements when processing critical sections. For example, a processing element can decrement an end critical section signal counter when an end critical section signal is received from an upstream processing element, and increment the counter when a critical section is processed. In this example, a threshold can be set that limits the number of critical sections that can be processed before end critical section signals are received from the upstream processor. This would allow a processing element to process critical sections before receiving an end critical section signal, up to some threshold. For example, with a counter initialized at zero, and a threshold set at two, a processing element could process two critical sections and increment the end critical section signal counter twice before suspending processing and waiting for an end critical section signal from an upstream processing element. Once the signal is received, the processing elements decrements the counter to less than two, and processing can resume.

Returning to processing diagram 700, PE-1 processes job 604 concurrent with PE-0. PE-1 begins processing job 604 with pre-critical section 634. PE-1 detects sync indicator 728 after processing pre-critical section 634. After detecting sync indicator 728, PE-1 suspends processing instructions until update receive control 520 receives end critical section signal 722 from upstream processor PE-0. Upon receipt of end critical section signal 722, PE-1 enters the critical section mode and processes the instructions of critical section 636. PE-1 leaves the critical section mode after processing critical section 636, and sends end critical section signal 732 to a downstream processing element. After exiting critical mode, PE-1 processes post-critical section 638.

Meanwhile, PE-0 continues processing task J0B at pre-critical section 628 after processing post-critical section 612. While processing pre-critical section 628, PE-0 detects sync indicator 718 in a manner similar to as described above in conjunction with sync indicator 708. PE-0 suspends processing until receiving end critical section signal 726 from the upstream processor. Once end critical section signal 726 is received, PE-0 enters critical mode and processes critical section 630.

Figure 8:
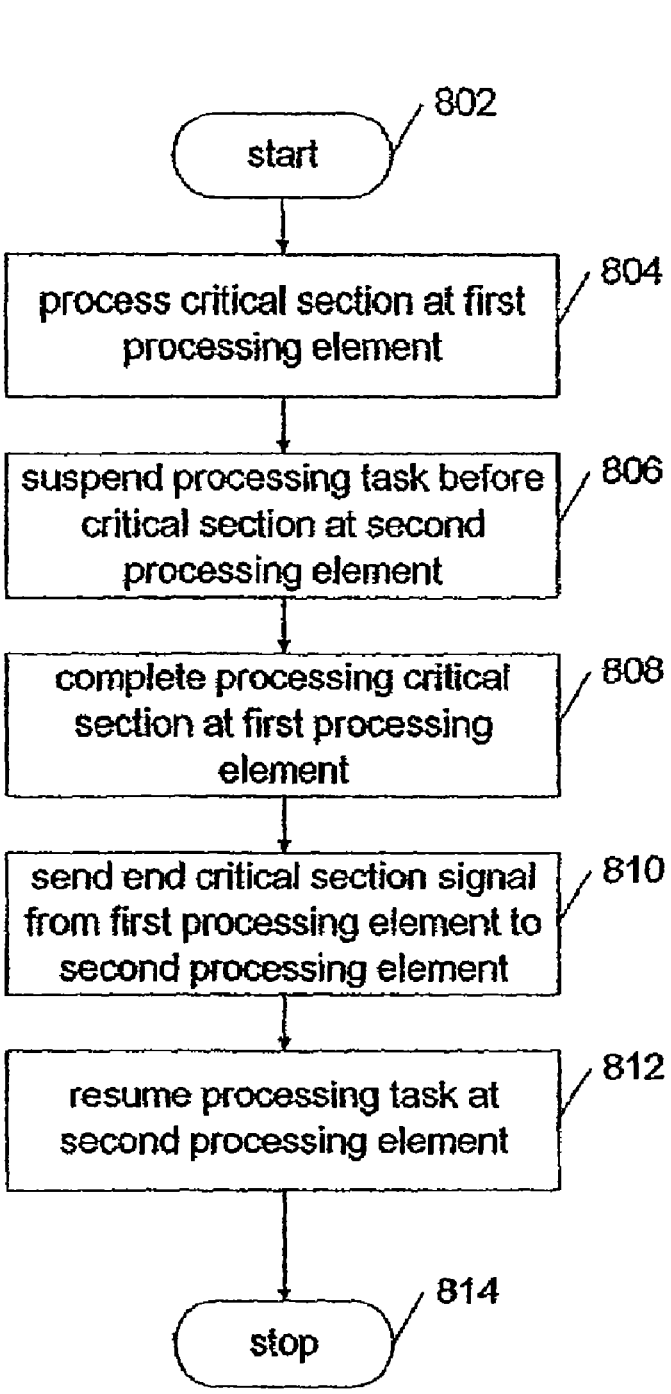
FIG. 8 illustrates a process for executing overlapping tasks.

FIG. 8 illustrates a process for executing overlapping tasks, according to an embodiment of the present invention. Method 800 is described in terms of a first, upstream processing element and a second, downstream processing element. Examples of such processing elements can be PE-0 and PE-1 of FIG. 7, processing element 404A and processing element 404B of FIG. 4B, etc.

After method 800 starts in step 802, the first processing element processes a critical section in step 804. Since the first processing element is processing a critical task, no end critical section signal, such as end critical section signal 722, is provided to the second, processing element.

In step 806, a second processing element is processing a task that includes a critical section. Since the second processing element has not received an end critical section signal from the upstream processing element, the second processing element suspends processing the task before processing instructions in the critical section.

In step 808, the first processing element detects an end sync indicator, indicating the end of processing the critical section. In step 810, the first processing element sends an end critical section signal, such as end critical section signal 722 to the second processing element, downstream. The end critical section signal indicates that the second processing element can resume processing a critical section. In step 812, the second processing element resumes processing the task at the point at which it was suspended. After step 812, the process of FIG. 8 ends in step 814.

In general, the present invention provides a system and method for processing network data elements concurrently at high speed across multiple processing elements. A network line module, such as network line module 1041, receives network data elements from a network or switch fabric via a network line module ingress port. The network data elements are provided to a multiprocessor core on the network line module. The received network data elements are distributed to multiple processing elements within the multiprocessor core.

The processing elements process the network data elements according to program instructions stored in a program memory. In one embodiment, teams of processing elements are arranged in a ring configuration. The network data elements are distributed to processing elements within the team for processing. Each processing element in the team executes program instructions for processing a network data element as a job. Communication between processing elements in the team maintains the order in which the network data elements are received during processing. In one embodiment, a first processing element suspends processing instructions until receiving a signal from a second processing element upstream from the first processing element. The signal indicates that the first processing element may continue processing without risk of changing the order of network data elements or corrupting data values held by a shared resource.

After processing, the multiprocessor core provides processed network data elements to the network line module. The network line module provides the processed network data element to an egress port connected to a network or switch fabric.

The aspect of the present invention described above provides techniques by which multiple processing elements can concurrently process multiple network data elements. The processing order of network data elements is maintained within the team by coordinated processing among the team processing elements. Communication is provided between adjacent team processing elements so that a processing element does not process a critical section until receiving an end critical section signal from an upstream processing element. The upstream processing element finishes processing a critical section before sending the end critical section signal. In a sense, permission to process a critical section is passed around the team of processing elements.

Although this first aspect of the present invention can be implemented independently, it may also be implemented in conjunction with another aspect of the present invention that increases processing speed by eliminating shared resource access latency from the successive executions of critical section code by a team of processing elements. According to this other aspect of the invention, rather than retrieving shared resource data from a shared resource, a processing element can receive shared resource data from an upstream processing element in the team. The received data can be used instead of data from a shared resource load or other shared resource access operation. In one embodiment, an upstream processing element forwards data representing a new value to be held by the shared resource to a forward queue of a downstream processing element. This aspect of the invention is described in more detail below.

Figure 9:
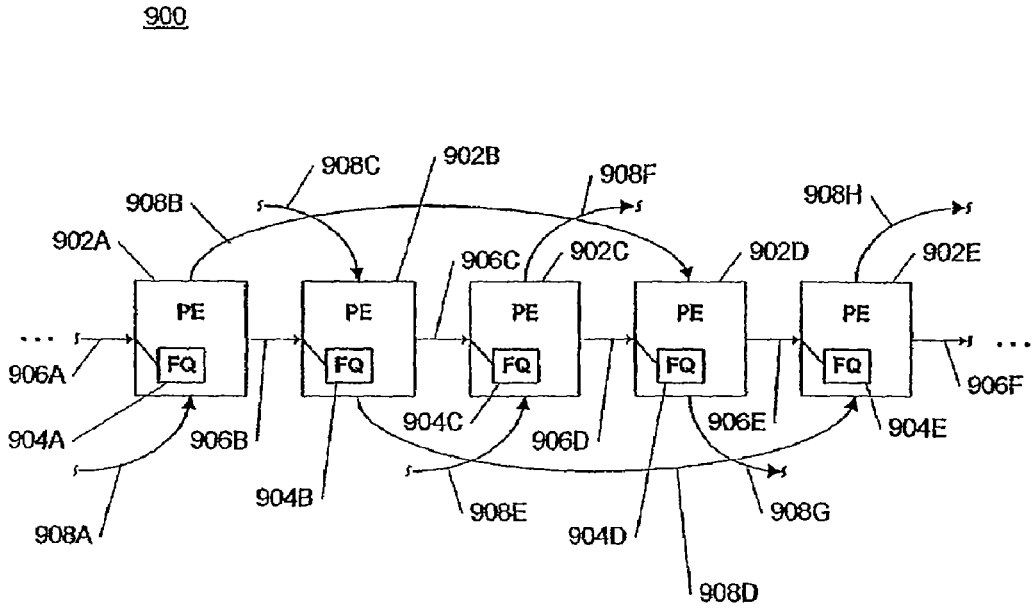
FIG. 9 illustrates a block diagram of a data forwarding system.

FIG. 9 illustrates a block diagram of a data forwarding system, according to the present invention. Data forwarding system 900 includes processing elements 902A, 902B, 902C, 902D, and 902E, which are of a type that can be employed in data communications system 100. Each of processing elements 902A-902E includes a forward queue, or forwarding storage element, shown as forward queues 904A-904E. In general, data forwarding system 900 operates to forward data between processing elements 902A-902E. A first processing element provides a copy of data to be written to a shared resource, such as a shared variable in memory, to a forward queue at a second processing element, downstream. When the downstream processing element is to access the shared resource, it determines if the forward queue includes a copy of the data. If the forward queue includes the data, the downstream processing element uses the copy and need not wait to retrieve it from the shared resource. Data forwarding provides a high level of efficiency when processing data from shared resources, since processing elements need not wait for data to be written to, or retrieved from, shared resources.

Note that FIG. 9 shows data forwarding system 900 as including a portion of a team of processing elements. The number and configuration of processing elements 902A-902E are chosen for ease of description, and any configuration including one or more processing elements is possible (e.g., one processing element may be used as a test case). For example, data forwarding system 900 can include two processing elements, three processing elements, four processing elements, etc. Additional examples of team configurations are shown in FIGS. 4A-4B.

Processing elements 902A-902E are connected by data forwarding connections 906A-906F. Processing element 902A is connected to processing element 902B via data forwarding connection 906B. Processing element 902B is connected to processing element 902C via data forwarding connection 906C. Processing element 902C is connected to processing element 902D via data forwarding connection 906D. Processing element 902D is connected to processing element 902E via data forwarding connection 906E.

End stores connections 908A-908H provide additional connections between processing elements 902A-902E. Processing element 902A is connected to processing element 902D via end stores connection 908B. Processing element 902B is connected to processing element 902E via end stores connection 908D. Each of processing elements 902A-902E includes an incoming end stores connection and an outgoing end stores connection. Partial end stores connections (i.e., end stores connections 908A, 908C, 908E, 908F, 908G, and 908H) are to processing elements not shown in FIG. 9 (i.e., farther upstream or downstream from the shown processing elements). For example, end stores connection 908A connects processing element 902A to a processing element further upstream.

Data forwarding connections 906A-906F can be any connection that allows one processing element to provide data to another. Examples of data forwarding connections are traces, or wires, between processing elements, optical connections, a data bus connecting processing elements, etc. In the embodiment of FIG. 5, for example, upstream connection 524 and downstream connection 526 provide data forwarding connections 906A-906F.

End stores connections 908A-908H can be anything that allows one processing element to provide a signal to another. Examples of end stores connections are traces between processing elements, optical connections, a data bus, etc. Note that although end stores connections 908B and 908D are shown as connecting every third processing element (e.g., processing elements 902A to 902D and 902B to 902E) other configurations are possible. For example, end stores connections can connect every processing element, every other processing element, or processing elements with multiple processing elements interposed between.

In one embodiment, the particular processing elements within a team that are connected by end stores connections are chosen based on shared resource access latency. Generally, it takes time to forward data downstream from one processing element to another. Eventually, it is more efficient for a processing element to retrieve the data from the shared resource, rather than wait to receive the data via data forwarding. In such a case, the processing element is connected to a processing element farther upstream via an end stores connection.

Each of forward queues 904A-904E receives data from an upstream processing element in the team. A forward queue can be anything that receives data from a processing element via a data forwarding connection. For example, a forward queue can be a buffer, a latch, a queue, a first-in-first-out storage element, a content addressable memory, an addressable memory, etc. Although forward queues 904A-904E are shown as part of processing elements 902A-902E, other configurations are possible. For example, forward queues 904A-904E can be interposed between processing elements 902A-902E as separate elements or included in the upstream processing elements.

In operation, a first processing element, such as processing element 902A, accesses and changes data that is associated with a shared resource. In addition to writing the changed data to the shared resource, processing element 902A forwards the changed data to forward queue 904B via data forwarding connection 906B.

Processing element 902B, in conjunction with an attempt to access the shared resource, attempts to access the data from forward queue 904B. If the changed data in forward queue 904B corresponds to the data the in the shared resource (e.g., based on address or other identifier information), processing element 902B accesses the data from forward queue 904B. If the data in forward queue 904B does not correspond the data in the shared resource, the processing element 902B accesses the data from the shared resource.

Additionally, processing element 902B forwards the data from the forward queue 904B downstream to processing element 902C, so that additional downstream processing elements have access to the changed data from processing element 902A. Because of complexity constraints, however, data cannot be forwarded downstream indefinitely. Eventually, it is more efficient for a downstream processing element to access the shared resource itself, rather than wait for the data to be forwarded through a number of upstream processing elements.

In one embodiment, each item of data in forward queues 904A-904E includes a time-to-live ("TTL") value. Because data can not be forwarded indefinitely, the TTL value defines how many times data will be forwarded to downstream forward queues. Each processing element decrements the TTL value associated with a particular data item each time it is forwarded to another processing element downstream. Eventually, the TTL value reaches zero, and the data is not forwarded. Note that although the present invention is described as including a TTL value, the TTL value can be omitted in an embodiment in which data is not forwarded to more than one processing element downstream. Note that the TTL value is one example of a mechanism for limiting forwarding, and other configurations are possible. For example, an update item can be forwarded one time and then discarded, obviating the need for a TTL value.

Since data is not forwarded indefinitely, a processing element far enough downstream will have to access the shared resource to retrieve data in question. Absent another protective mechanism, it is possible that a conflict for access to the shared resource could arise between the upstream and downstream processing elements. To address this concern, upstream processing elements provide an "end stores" signal to downstream processing elements via end stores connections 908A-908H signaling that the downstream processing elements may access the shared resource without risk of conflict. For example, processing element 902A, signals to processing element 902D that data has been written to the shared resource. After receiving the signal, processing element 902D can access the shared resource. End stores connections 908A-908H are described in further detail below. Note that the end stores signal is one example of a mechanism for precluding conflict with processing elements farther downstream, and other configurations are possible.

Figure 10:
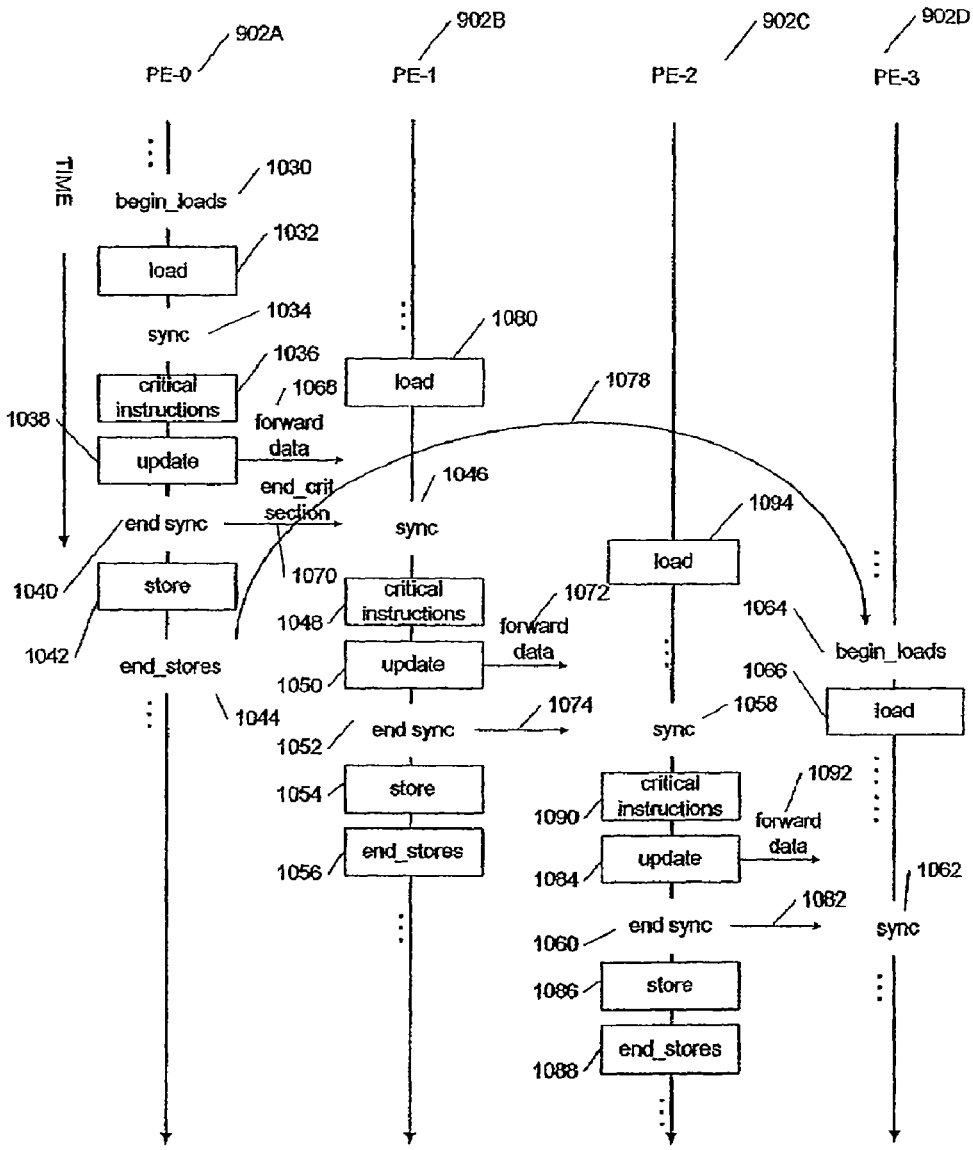
FIG. 10 illustrates an instruction processing diagram.

FIG. 10 illustrates an instruction processing diagram, according to an embodiment of the present invention. Instruction processing diagram 1000 shows the processing of instructions for data forwarding by members of a processing element team. Instruction processing diagram 1000 shows instruction processing as four vertical columns, each of which is associated with one of processing elements 902A, 902B, 902C, and 902D.

Reference to the processing elements of FIG. 9, as well as the number and configuration of the processing elements, are chosen for ease of description, and other configurations are possible. For example, as few as one processing element, and as many processing elements as is practical can be included. Additionally, other configurations of signaling between processing elements are possible. For example, processing element 902A can provide forward data signal 1068 to processing elements farther downstream than processing element 902B.

Additionally, processing element 902A provides end stores signal 1078 to processing element 902D for illustrative purposes only, and the signal can be provided to other processing elements in the team. For example, processing element 902A can provide end stores signal 1078 to processing element 902B, processing element 902C, or other processing elements not shown in FIG. 9.

Instruction processing diagram 1000 shows processing element 902A processing a stream of instructions including begin loads indicator 1030, load instruction 1032, sync indicator 1034, critical section instructions 1036, update instruction 1038, end sync indicator 1040, store instruction 1042, and end stores indicator 1044. Note that the combinations of instructions of instruction processing diagram 1000 are shown for illustrative purposes only, and the underlying concepts of the present invention encompass other combinations of instructions. For example, the processing elements in a team are configured in a ring and each processing element processes all of the types of instructions, generates all of the signals, and receives all of the signals shown in instruction processing diagram 1000.

Instruction processing diagram 1000 shows processing element 902A providing forward data signal 1068 to processing element 902B, end critical section signal 1070 to processing element 902B, end stores signal 1078 to processing element 902D.

Instruction processing diagram 1000 shows processing element 902B processing a stream of instructions including load instruction 1080, sync indicator 1046, critical section instructions 1048, update instructions 1050, end sync indicator 1052, store instruction 1054, and end stores indicator 1056. Instruction processing diagram 1000 shows processing element 902B providing forward data signal 1072 to processing element 902C and end critical section signal 1074 to processing element 902C.

Instruction processing diagram 1000 shows processing element 902C processing a stream of instructions including load instruction 1094, sync indicator 1058, critical section instructions 1090, update instructions 1084, end sync indicator 1060, store instruction 1086, and end stores indicator 1088. Instruction processing diagram 1000 shows processing element 902C providing forward data signal 1092 to processing element 902D and end critical section signal 1082 to processing element 902D.

Instruction processing diagram 1000 shows processing element 902D processing a stream of instructions including begin loads indicator 1064, load instruction 1066, and end sync indicator 1062. Instruction processing diagram 1000 shows processing element 902D receiving end stores signal 1078 from processing element 902A.

While processing a stream of instructions, processing element 902A encounters begin loads indicator 1030. Begin loads indicator 1030 indicates an impending load instruction that references a shared resource. Generally, begin loads indicator 1030 is used to coordinate load and store access to a shared resource. In one embodiment, begin loads indicator 1030 is an instruction that precedes load instruction 1032 and includes an additional bit, or "begin loads bit," identifying the instruction as a begin loads indicator. Note also that a begin loads indicator can be included with the load instruction itself, with any instruction preceding a load instruction. Although one embodiment is described in terms of begin loads bits, other types of begin loads indicators are possible. For example, begin loads indicator 1030 can be a particular type of instruction or a type of no-op instruction identifying an impending load instruction. Processing of begin loads indicators is described in further detail below in conjunction with end stores signal 1078 and processing element 902D.

Processing element 902A processes load instruction 1032 after processing begin loads indicator 1030. Load instruction 1032 causes processing element 902A to begin loading data from a shared resource, as described above in reference to FIG. 7. In an embodiment of the present invention, load instructions are processed before entering a critical section, or before processing a sync indicator. When the results of load instruction 1032 are received, processing element 902A stores the data received from the shared resource for processing, such as in a register. Next, processing element 902A processes sync indicator 1034, and critical section instructions 1036. Sync indicator 1034 and critical section instructions 1036 are processed as described above with reference to FIG. 7. Critical instructions 1036, however, include at least one instruction that references or modifies the data loaded from the shared resource. Since other processing elements may need to reference the shared data, a store instruction later in the program causes processing element 902A to write the modified data back to the shared resource.

Processing element 902A processes update instruction 1038 after processing critical section instructions 1036. Note that update instruction 1038 is part of the critical section defined by sync indicator 1034 and end sync indicator 1040. As such, update instruction 1038 is a critical section instruction, but is separately shown for illustrative purposes. Update instruction 1038 causes processing element 902A to provide the modified data to processing element 902B as forward data signal 1068, via data forwarding connection 906B.

Although a specific example of an update instruction is described, a number of embodiments are possible. An update instruction 1038 can be, for example, an instruction that includes additional bits that indicate to processing element 902A that the instruction results should be forwarded. As such, update instruction 1038 can be one of the instructions in critical section instructions 1036 that, when processed, causes the results to be forwarded to processing element 902B. In another embodiment, update instruction 1038 can be an instruction identifying a particular register, the contents of which are to be forwarded to processing element 902B. Note that only one update instruction (update instruction 1038) is shown for descriptive clarity, and that processing element 902A can process any number of update instructions in a critical section, each of which forwards data values to processing element 902B.

Forward data signal 1068 can include a data value, a data register number, a shared resource address, a TTL value, and a last update indicator. The data value is the value of the data being forwarded. The data register number identifies a particular data register with which the data is associated. For example, a processing element may include a register file that includes a number of registers, such as register file 514 of processing element 500. The data register number identifies a particular register in register file 514. The shared resource address identifies the particular shared resource address of the data originally loaded. The TTL (i.e., time-to-live) value indicates how far downstream the data should be forwarded, as described above. The last update flag indicates that the processing element has processed the last update instruction in the critical section, and no more data forward signals will be provided to the downstream processing element in relation to that critical section.

FIG. 12 illustrates the contents of a forward queue, according to an embodiment of the present invention. Forward queue 1200 includes a data value field 1202, a shared resource address field 1204, a register number field 1206, a TTL value field 1208, and a last update field 1210. In operation, processing element 902A generates forward data signal 1068 each time an update instruction is processed. Each forward data signal 1068 is stored as a new row, or "update item" 1212, in forward queue 1200. Update item 1212 includes a data value in data value field 1202, shared resource address in shared resource address field 1204, a data register number in register number field 1206, a TTL value in TTL field 120, and a last update value in last update field 1210. The use of the various values of forward queue 1200 is described in further detail below.

Returning to FIG. 10, processing element 902A processes end sync indicator 1040 after processing update instruction 1038. End sync indicator 1040 is processed in the manner described in conjunction with FIG. 7. End sync indicator 1040 causes processing element 902A to send end critical section signal 1070 to processing element 902B via data forwarding connection 906B. As described above in conjunction with FIG. 7, processing element 902B does not process critical section instructions 1048 until receiving end critical section signal 1070. Note, however, that although processing element 902B is illustrated as suspending processing until end critical section signal 1070 is received, other scenarios are possible. For example, processing element 902B may receive end critical section signal 1070 before encountering a critical section, and in such a case, would process critical section instructions 1048 without pausing.

Next, processing element 902A processes store instruction 1042. Store instruction 1042 causes processing element 902A to store data values from a register to the shared resource. Processing element 902A processes end stores indicator 1044 after processing store instruction 1042. Although a specific example of an end stores indicator is described as a separate instruction, other configurations are possible. For example, end stores bits may be included in other instructions, for example store instructions, that identify the instruction as an end stores indicator. End stores indicator 1044 causes processing element 902A to send end stores signal 1078 to processing element 902D via end stores connection 908B. End stores signal 1078 indicates that processing element 902A has processed the last store instruction, or store instruction 1042.

Although end stores signal 1078 indicates that store instruction 1042 has been processed, due to memory or peripheral latency the store operation may not be complete when end stores indicator 1044 is processed. This is to say that end stores indicator 1044 is processed without waiting for completion of store instruction 1042. End stores signal 1078 is discussed in more detail in conjunction with processing element 902D and begin loads indicator 1064, below.

Instruction processing diagram 1000 shows processing element 902B as beginning processing at load instruction 1080. At some point during instruction processing, processing element 902B receives forward data signal 1068 from processing element 902A. The data included in forward data signal 1068 is included in forward queue 904B as an update item.

Although instruction processing diagram 1000 shows processing element 902B as receiving forward data signal 1068 between load instruction 1080 and sync indicator 1046, forward data signal 1068 can be received anytime before processing element 902B begins processing critical section instructions 1048. As discussed above in conjunction with FIG. 7, processing element 902B suspends processing instructions at sync indicator 1046 until receiving end critical section signal 1070.

Once processing element 902B receives end critical section signal 1070, processing resumes at sync indicator 1046. Normally, there is a time delay between processing load instruction 1080 and actually receiving the data from the shared resource. As a result, processing element 902B may not have received the data from the shared resource when end critical section signal 1070 is received. In such a case, processing element 902B can still process critical section instructions 1048 if forward queue 904B includes the data referenced by load instruction 1080.

Processing element 902B determines if forward queue 904B includes the data referenced by load instruction 1080 by processing the update items in the forward queue and comparing them to addresses from which data has been loaded by load instruction 1080. If forward queue 904B includes the data referenced by load instruction 1080, processing element 902B uses the copies of the data from forward queue 904B rather than waiting for load instruction 1080 to complete. This allows processing element 902B to process critical section instructions 1048 immediately using data from forward queue 904B. How processing element 902B processes the update items in forward queue 904B is described in further detail below.

Additionally, processing element 902B decrements the TTL values associated with each update item, and update items with a decremented TTL value of less than one are not forwarded. The remaining update items are forwarded as forward data signal 1072, such as forward data signal 1068, via data forwarding connection 906C. In one embodiment, processing element 902B forwards update items downstream to processing element 902B as they are processed.

Note that consideration must be given to the case in which multiple processing elements forward multiple versions of the contents of a shared resource address, such as a single shared variable. For example, processing element 902A can forward a value of a shared variable to processing element 902B which, in turn, can forward the value to processing element 902C. Subsequently, processing element 902B can modify the value, and forward the modified value to processing element 902C. In this example, processing element 902C receives two potentially conflicting copies of the shared variable, the first from processing element 902A and the second from processing element 902B. One way of addressing the issue of conflicting copies of the shared variable is to use a first-in-first-out (FIFO) storage element as a forward queue. Using a FIFO, the processing element overwrites the older copies of the shared variable with the last, or latest, copy of the shared variable in the forward queue.

Once the update items in forward queue 904B are processed, processing element 902B processes critical instructions 1048. Any critical section instruction that is an update instruction causes processing element 902B to provide the changed data (as described above in conjunction with update instructions 1038) to processing element 902C as forward data signal 1072 via data forwarding connection 906C. Processing element 902B processes end sync indicator 1052 after processing update instruction 1050. End sync indicator 1074 causes processing element 902B to provide end critical section signal 1074 to processing element 902C via data forwarding connection 906C.

Processing element 902B processes store instruction 1054 after processing end sync indicator 1052. Store instruction 1054 causes processing element 902B to store changed data to the shared resource. Processing element 902B processes end stores indicator 1056 after processing store instruction 1054. End stores indicator 1056 causes processing element 902B to provide an end stores signal (not shown), similar to end stores signal 1078, to a processing element downstream (not shown). In FIG. 9, for example, processing element 902B provides the end stores signal to processing element 902E via end stores connection 908D.

Once processing element 902C receives end critical section signal 1074, processing resumes at sync indicator 1058. Processing element 902C determines if forward queue 904C includes the data referenced by load instruction 1094. If forward queue 904C includes the data referenced by load instruction 1094, processing element 902C uses the copies of the data from forward queue 904B rather than waiting for load instruction 1094 to complete.

Once the update items in forward queue 904C are processed, processing element 902C processes critical instructions 1090. After processing critical instructions 1090, processing element 902C processes update instruction 1084. Update instruction 1084 causes processing element 902C to provide the changed data to processing element 902C as forward data signal 1092 via data forwarding connection 906C. Processing element 902C processes end sync indicator 1060 after processing update instruction 1084. End sync indicator 1082 causes processing element 902C to provide end critical section signal 1082 to processing element 902D via data forwarding connection 906D.

Processing element 902C processes store instruction 1086 after processing end sync indicator 1060. Processing element 902C processes end stores indicator 1088 after processing store instruction 1086. End stores indicator 1088 causes processing element 902C to provide an end stores signal (not shown), similar to end stores signal 1078, to a processing element downstream (not shown).

Processing element 902D is shown beginning processing with begin loads indicator 1064. Begin loads indicator 1064 enables processing elements to avoid conflict for shared resources. Begin loads indicator 1064 ensures that processing element 902A has finished processing store instruction 1042 before processing element 902D begins loading data from the shared resource in load instruction 1066. Processing element 902D suspends processing instructions at begin loads indicator 1064 until end stores signal 1078 is received from processing element 902A.

As discussed above, because of practical considerations, data is not forwarded indefinitely. Eventually, the TTL value of an update item is decremented to less than one and it is not forwarded. In the example of FIG. 10, data from processing element 902A is forwarded to processing element 902B and processing element 902C, but is not forwarded to processing element 902D. Since processing element 902D must access the shared resource to retrieve data it is possible that a conflict for access to the shared resource will arise with processing element 902A.

For example, in one possible embodiment, the TTL value of an update item is initially set so that the update item is not forwarded so far downstream as to be received by the processing element connected by an end stores connection. Consider, for example, an update item generated by processing element 902A. The update item TTL value is set to two. Since both processing element 902B and processing element 902C decrement the TTL value by one, processing element 902C does not forward the update item to processing element 902D. Thus, processing element 902D, which is connected to processing element 902A by end stores connection 908B, must retrieve the data from the shared resource.

The problem is that processing element 902D needs to wait for processing element 902A to finish processing store instruction 1042 before initiating a load instruction, to avoid receiving an outdated or invalid copy of data. Consider, for example, the situation in which processing element 902D processes load instruction 1066 before store instruction 1042 is completed. In this situation, it is possible that processing element 902D will load an outdated version of data from the shared resource before processing element 902A has completed storing the changed data. As a result, processing element 902D will have an outdated version of the data, and may result in program failure.

Begin loads indicator 1064 and end stores signal 1078 addresses the potential conflicting accesses to the shared resource. Processing element 902D ensures that the data in the shared resource has not been changed while the access is taking place by suspending processing instructions at begin loads indicator 1064, and waiting until end stores signal 1078 is received. Careful consideration, however, should be given to the timing of providing the end stores signal, so as to ensure load instruction 1066 always results in a valid copy of the data stored by processing element 902A. Processing element 902D resumes processing at load instruction 1066 once end stores signal 1078 is received. Instruction processing proceeds as described above for all instructions after load instruction 1066.

The operation of data forwarding is described in reference to processing element 500 of FIG. 5. Processing element 500 receives forward data signals via upstream connection 524 and transmits forward data signals via downstream connection 526. When processing element 500 processes an update instruction, the data identified by the update instruction is provided to update transmit control 522. Update transmit control 522 generates the forward data signal that is provided to the downstream processor.

When processing element 500 receives a forward data signal, update receive control 520 stores the forward data signal as an update item in the forward queue. In the embodiment of FIG. 5, update receive control 520 acts as the forward queue. When processing element 500 reaches a sync indicator identifying the beginning of a critical section in a job, processing update items in update receive control 520 can begin. Processing the update items in update receive control 520 provides the mechanism for using the data in update receive control 520 rather than data from the shared resource. Processing element 500 processes the update items until the last update indicator is found in the end update items signal is found in update receive control 520. Eventually, processing element 500 receives an end critical section signal via upstream connection 524.

Generally, processing the update items involves comparing the shared resource address field for each update item with the address associated with the load instructions processed in the begin loads portion of the job. Processing element 500 has already processed the load instructions in the begin loads portion of the job when the sync indicator is encountered. As processing element 500 processes the load instructions, the shared resource addresses from which load instructions are to retrieve the data are stored in address binding memory 518. When processing element 500 begins to process the update items in update receive control 520, an address comparator compares the shared resource address field associated with each update item with the addresses in address binding memory 518 to determine if they are equal.

In one embodiment, address binding memory 518 includes a number of registers equal to the number of registers in register file 514. A load instruction includes a register number identifying a register in register file 514 to which the retrieved information is to be stored. In processing the load instruction, the address associated with the load instruction is written to the register in address binding memory 518 that corresponds to the register number. When update items are processed, the register number field of the update item identifies the particular register in address binding memory 518 with which to compare the update item address field (e.g., address field 1204). If the update item address field matches the address in address binding memory 518, the data value field associated with the update item is written to register file 514 at the particular register identified by the register number field. If, on the other hand, the shared resource address field associated with the update item does not match an address in address binding memory 518, processing element 500 does not write the value from update receive control 520 to the register file 514.

Similarly, the address binding memory 518 is accessed when processing element 500 generates an update item. An update item is generated in response to processing an update instruction. An update instruction includes a register number that identifies the register to which the result of the instruction is to be written. To generate an update item, the address is retrieved from the location in address binding memory 518 that corresponds to the register number. Both the register number and the address are used to generate the update item for forwarding.

In an alternate embodiment, the address binding memory 518 can be small content addressable memory (CAM). In this embodiment, the size of the CAM can be chosen to store as many addresses as there can be load instructions between a begin loads indicator and a sync indicator in a job. When processing element 500 processes the load instructions, the register number associated with each load instruction is written to the CAM and associated with the load instruction shared resource address. When update items are processed, the CAM is accessed using the address field from the update item. If the address field corresponds to an address stored in the CAM, the CAM outputs the register number. Subsequently, the update item is written to register file 514 at the register identified by the register number field, as described above.

Similarly, the CAM is accessed when processing element 500 generates an update item. To generate an update item, the register number from an update instruction is used to access the CAM. The CAM provides the address associated with the register number, and the address is used to generate the update item for forwarding.

In yet another embodiment, the address binding memory 518 can be a CAM that stores as many addresses as there are registers in register file 514. In this embodiment, processing element 500 stores the shared resource address associated with the load instruction at a location in the CAM corresponding to the register number from the load instruction. When update items are processed, the CAM is accessed using the address field from each update item. If the address matches an address in the CAM, the CAM provides the register number associated with the address. If a match is found, the update item is written to register file 514 at the register identified by the register number, as described above.

Similarly, the CAM is accessed when processing element 500 generates an update item. To generate an update item, the register number from an update instruction is used to access a location of the CAM. The CAM provides the address associated with the register number, and the address is used to generate the update item for forwarding.

When the update items are processed, the TTL value field of each update item is decremented. If the decremented TTL value is less than 1, the update item is not forwarded. If, on the other hand, the decremented TTL value is not less than 1, update transmit control 522 provides the update item as a forward data signal to a downstream processor via downstream connection 526.

When processing element 500 begins to process the update items in update receive control 520, the shared resource address field associated with each update item is compared with the addresses in address binding memory 518. If the shared resource address field matches an address in address binding memory 518, the data value field associated with the update item is written to register file 514 at the particular register identified by the register number field.

Figure 11:
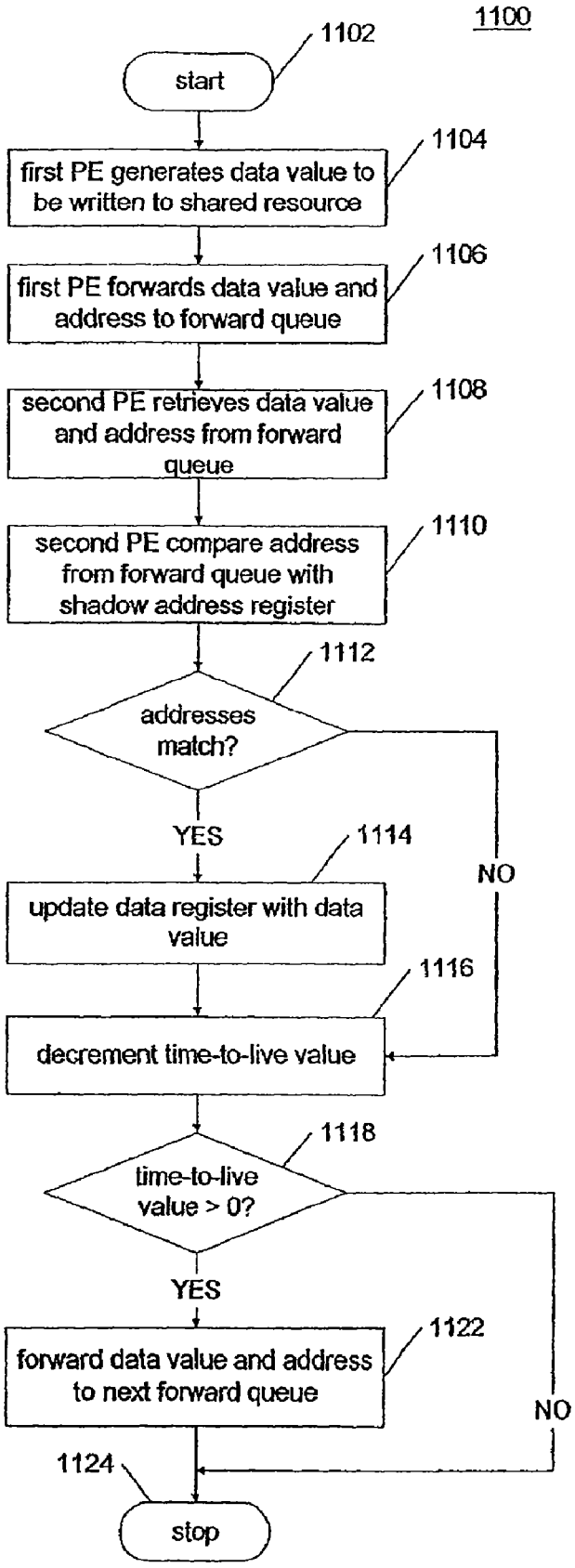
FIG. 11 illustrates a process for data forwarding.

FIG. 11 illustrates a process for data forwarding, according to an embodiment of the present invention. Method 1100 is described in terms of a first (upstream) processing element and a second (downstream) processing element.

After method 1100 starts in step 1102, the first processing element generates a data value to be written to a shared resource, in step 1104. The data value can be anything to be written to a shared resource. In step 1106 the first processing element forwards the data value, and any associated information generated in step 1104 to a forward queue. Associated information can include, for example, the shared resource address to which data value was to be written, a TTL value, a last update flag, a register identifier, etc.

In step 1108, the second processing element retrieves the data value and associated information from the forward queue. The forward queue can be included in the first processing element, the second processing element, or as an element separate from both processing elements.

In step 1110, the second processing element compares the address information from the forward queue with address information in the address binding memory. The address information in the address binding memory can be any information associated with a request for data from a shared resource. In the example of FIG. 11, the address information includes an address associated with a load instruction processed by the second processing element.

In decision step 1112, the second processing element determines whether the addresses in the address binding memory match the address information associated with an update item in the forward queue. Although the comparison is described as matching, any configuration that identifies the information as corresponding with the information received from the first processor is possible. For example, the first processing element can provide a hash of an address to the second processing element for comparison with a hash in the address binding memory. If the addresses match, method 1100 continues in step 1114.

In step 1114, the second processing element updates a register with the data value from the forward queue. In one possible embodiment, the second processing element writes the data value to a register identified by the register identifier associated with the update item. In an alternate embodiment, a memory element, such as a CAM, in the processing element can provide the register identifier. After step 1114, process 1100 continues in step 1116. If, on the other hand, the second processing element determines that there is no match between the addresses in step 1112, the process of method 1100 continues in step 1116. As described above, a TTL value is one example of a mechanism for limiting forwarding, and other configurations are possible. As such, steps 1116 through 1118 are optional, and depend upon the existence of a TTL value among the information forwarded with the data value.

In step 1116, the second processing element decrements the time-to-live value. In decision step 1118, the second processing element determines if the time-to-live value is greater than zero. If the time-to-live value is not greater than zero, the update item is not forwarded, and method 1100 ends in step 1124.

If, on the other hand, the time-to-live value is greater than zero, method 1100 continues in step 1122. In step 1122, the second processing element forwards the data value and address information as an update item to a downstream processor. After step 1122, method 1100 stops in step 1124.

FIG. 13 illustrates an exemplary instruction, according to an embodiment of the present invention. Exemplary instruction 1300 includes opcode 1302, source 0 1304, source 1 1306, destination 1308, update 1310, sync 1312, end stores 1314, and begin loads 1316.

Opcode 1302 is the operator for instruction 1300. Source 0 1304 specifies a first operand operated upon by opcode 1302. Source 1 1306 specifies a second operand operated upon by opcode 1302. Destination 1308 identifies a register to which the results of opcode 1302 are stored.

Update 1310 is a flag, such as a bit, that identifies instruction 1300 as an update instruction. Sync indicator 1312 is a flag that identifies instruction 1300 as beginning a critical section.

End stores 1314 is a flag that identifies instruction 1300 as an end stores indicator. Begin loads 1316 is a flag that identifies instruction 1300 as a begin loads indicator.

The system and method of the present invention provide techniques by which multiple processing elements can process multiple network data elements concurrently at high speed. A team of processing elements is defined as a loop, or ring, and communication between processing elements in the team enables a programmable network processor to maintain correct order in processing network data elements. The order for processing network data elements is maintained by coordinated processing of critical sections of tasks. Upon finishing processing a critical section, a processing element generates an end critical section signal and sends it to a downstream processing element. The downstream processing element does not process a critical section before receiving the end critical section signal.

The system and method of the present invention also increases processing speed by eliminating shared resource access latency from the critical path for processing multiple network data elements by a team of processing elements. Rather than accessing a shared resource, a processing element receives shared resource data from an upstream processing element in the team. The data from the upstream processing element is used instead of data from a shared resource load or other shared resource access operation. The upstream processing element forwards any data to be written to the shared resource to a forward queue, where the data is received by the processing element. The processing element is able to use the forwarded data directly, rather than retrieving the data from the shared resource. Forwarding data between processing elements eliminates time delay due to access latency.

It will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A data processing apparatus comprising:

a first processing element;

a forwarding storage element; and a second processing element, wherein said first processing element is operable to send first data to a resource and to send second data to said forwarding storage element, wherein the first data corresponds to original data, wherein the second data corresponds to the original data, wherein said second processing element is operable to attempt to access the first data in the resource, wherein said second processing element is operable to attempt to access the second data in said forwarding storage element, and wherein when said second processing element accesses the first data in the resource and accesses the second data in said forwarding storage element, and when it is determined that the first data in the resource and the second data in said forwarding storage element are not the same, said second processing element [uses] *reads* the second data from said forwarding storage element.

2. The data processing apparatus of claim 1, wherein said first processing element includes an update-transmit element operable to provide a signal indicating that said first processing element is processing an instruction that utilizes the resource.

3. The data processing apparatus of claim 1, wherein said first processing element includes an update-transmit element operable to provide a signal indicating that said first processing element has finished processing an instruction that utilizes the resource.

4. The data processing apparatus of claim 1, wherein said forwarding storage element comprises a first-in first-out storage element.

5. The data processing apparatus of claim 1, wherein said forwarding storage element is operable to store data elements in a queue.

6. A data processing method comprising:

sending first data, which corresponds to original data, from a first processing element to a resource;

sending second data, which corresponds to the original data, from the first processing element to a forwarding storage element; accessing, via a second processing element, the first data in the resource;

accessing, via the second processing element, the second data in the forwarding storage element; determining whether the first data in the resource and the second data in the forwarding storage element are not the same; and [using] *reading* one of the first data in the resource and the second data in the forwarding storage element when said determining determines that the first data in the resource and the second data in the forwarding storage element are the same and [using] *reading* the second data from the forwarding storage element when said determining determines that the first data in the resource and the second data in the forwarding storage element are not the same.

7. The data processing method of claim 6, further comprising providing, to the second processing element, a signal indicating that the first processing element is processing an instruction that utilizes the resource.

8. The data processing method of claim 6, further comprising providing, to the second processing element, a signal indicating that the first processing element has finished processing an instruction that utilizes the resource.

*9. A data processing apparatus comprising:*

*a memory configured to store instructions comprising:*

*instructions to send first data from a first processing element to a resource and to send second data from the first processing element to a forwarding storage element, the first and second data corresponding to original data,*

*instructions to attempt to access the first data in the resource by a second processing element,*

*instructions to attempt to access the second data in the forwarding storage element by the second processing element,*

*instructions to determine that the first data in the resource and second data in the forwarding storage element are not the same, after accessing the first data and the second data by the second processing element, and*

*instructions to read the second data from the forwarding storage element, responsive to determining that the first data and the second data are not the same by the second processing element; and*

*one or more processors configured to process the instructions.*

*10. The data processing apparatus of claim 9, the instructions further comprising instructions to provide a signal indicating that the first processing element is processing an instruction that utilizes the resource.*

*11. The data processing apparatus of claim 9, the instructions further comprising instructions to provide a signal indicating that the first processing element has finished processing an instruction that utilizes the resource.*

*12. The data processing apparatus of claim 9, wherein the forwarding storage element comprises a first-in first-out storage element.*

*13. The data processing apparatus of claim 9, the instructions further comprising instructions to store data elements in a queue by the forwarding storage element.*

* * * * *

UNITED STATES PATENT AND TRADEMARK OFFICE

CERTIFICATE OF CORRECTION

PATENT NO. : RE43,825 E
APPLICATION NO. : 11/942275
DATED : November 20, 2012
INVENTOR(S) : Apisdorf et al.

It is certified that error appears in the above-identified patent and that said Letters Patent is hereby corrected as shown below:

In the Specifications:

In Column 9, Line 54, delete “JIL” and insert -- J1L --, therefor.

In Column 10, Line 28, delete “712” and insert -- 712, --, therefor.

In Column 12, Line 38, delete “gel” and insert -- get --, therefor.

In Column 14, Line 57, delete “1041,” and insert -- $104_1$, --, therefor.

In Column 16, Line 29, delete “to” and insert -- two --, therefor.

In Column 17, Line 16, delete “the in the” and insert -- in the --, therefor.

Signed and Sealed this
Seventh Day of May, 2013

Teresa Stanek Rea
*Acting Director of the United States Patent and Trademark Office*